(12) United States Patent
Yu et al.

(10) Patent No.: US 11,912,842 B2
(45) Date of Patent: Feb. 27, 2024

(54) FOAM BEAD AND SINTERED FOAM STRUCTURE

(71) Applicant: Dow Global Technologies LLC, Midland, MI (US)

(72) Inventors: Haiyang Yu, Shanghai (CN); Yunfeng Yang, Shanghai (CN); Jozef J I Van Dun, Horgen (CH)

(73) Assignee: Dow Global Technologies LLC, Midland, MI (US)

( * ) Notice: Subject to any disclaimer, the term of this patent is extended or adjusted under 35 U.S.C. 154(b) by 524 days.

(21) Appl. No.: 17/254,915

(22) PCT Filed: Jun. 29, 2018

(86) PCT No.: PCT/CN2018/093537
§ 371 (c)(1),
(2) Date: Dec. 22, 2020

(87) PCT Pub. No.: WO2020/000337
PCT Pub. Date: Jan. 2, 2020

(65) Prior Publication Data
US 2022/0049065 A1   Feb. 17, 2022

(51) Int. Cl.
| C08J 9/232 | (2006.01) |
| C08J 9/18 | (2006.01) |
| C08F 297/08 | (2006.01) |
| C08J 9/00 | (2006.01) |
| C08J 9/12 | (2006.01) |
| C08L 53/00 | (2006.01) |

(52) U.S. Cl.
CPC ........... *C08J 9/232* (2013.01); *C08F 297/083* (2013.01); *C08J 9/0061* (2013.01); *C08J 9/122* (2013.01); *C08J 9/18* (2013.01); *C08L 53/00* (2013.01); *C08J 2203/06* (2013.01); *C08J 2353/00* (2013.01); *C08J 2453/00* (2013.01); *C08L 2203/14* (2013.01); *C08L 2205/025* (2013.01)

(58) Field of Classification Search
CPC . C08J 9/232; C08J 9/0061; C08J 9/122; C08J 9/18; C08J 2203/06; C08J 2353/00; C08J 2453/00; C08J 2203/08; C08J 2423/08; C08J 2423/10; C08J 9/16; C08F 297/083; C08L 53/00; C08L 2203/14; C08L 2205/025
See application file for complete search history.

(56) References Cited

U.S. PATENT DOCUMENTS

| 5,208,265 A * | 5/1993 | de Grave ............ C08L 23/142 525/88 |
| 5,616,627 A | 4/1997 | Sakurai et al. |
| 5,919,983 A | 7/1999 | Rosen et al. |
| 7,951,882 B2 | 5/2011 | Arriola et al. |
| 8,053,529 B2 | 11/2011 | Carnahan et al. |
| 8,501,885 B2 | 8/2013 | Arriola et al. |
| 8,686,087 B2 | 4/2014 | LiPiShan et al. |
| 8,716,400 B2 | 5/2014 | Carnahan et al. |
| 8,802,774 B2 | 8/2014 | Carnahan et al. |
| 9,260,577 B2 | 2/2016 | Sieradzki et al. |
| 9,511,567 B2 | 12/2016 | Hu et al. |
| 9,688,795 B2 | 6/2017 | Cerk et al. |
| 10,435,530 B2 | 10/2019 | Takagi et al. |
| 10,761,072 B2 | 9/2020 | Cong et al. |
| 2011/0313106 A1 | 12/2011 | LiPiShan et al. |
| 2011/0313108 A1 | 12/2011 | LiPiShan et al. |
| 2015/0025165 A1 | 1/2015 | Chen et al. |
| 2018/0127559 A1 | 5/2018 | Takagi et al. |
| 2019/0263994 A1 | 8/2019 | Takagi et al. |
| 2021/0060833 A1 | 3/2021 | Takagi et al. |

FOREIGN PATENT DOCUMENTS

| EP | 1026184 A1 * | 8/2000 | ............ C08F 297/08 |
| EP | 2163574 A1 | 3/2010 | |
| EP | 2508555 B1 | 5/2015 | |
| JP | H04-89846 A | 3/1992 | |
| JP | 3110088 B2 | 11/2000 | |
| JP | 2002-011748 A | 1/2002 | |
| JP | 2005-200475 A | 7/2005 | |
| JP | 3703565 B2 | 10/2005 | |
| JP | 2007-045896 A | 2/2007 | |
| JP | 4618925 B2 | 1/2011 | |
| JP | 5025621 B2 | 9/2012 | |
| JP | 5134810 B2 | 1/2013 | |
| JP | 5261639 B2 | 8/2013 | |
| JP | 2013-209552 A | 10/2013 | |
| JP | 2014-141566 A | 8/2014 | |
| JP | 2016-056264 A | 4/2016 | |
| WO | 2006099631 A1 | 9/2006 | |

* cited by examiner

*Primary Examiner* — Irina S Zemel
(74) *Attorney, Agent, or Firm* — Boyle Fredrickson SC

(57) ABSTRACT

The present disclosure provides a foam bead. The foam bead contains at least one of the following components: (A) a block composite; and/or (B) a crystalline block composite. The present disclosure also provides a sintered foam structure formed from a composition comprising at least one of the following components: (A) a block composite; and/or (B) a crystalline block composite.

10 Claims, 2 Drawing Sheets

FOAM BEAD AND SINTERED FOAM STRUCTURE

BACKGROUND

The present disclosure relates to polyolefin foams, and further polypropylene-based polymer foams. Polyolefin foams are conventionally utilized in footwear components, such as midsole applications. Crosslinked ethylene-based polymers including ethylene vinyl acetate (EVA) copolymer and polyolefin elastomers have traditionally dominated the polyolefin foam market in footwear as they can easily be foamed with a chemical blowing agent. However, chemical blowing agents are known to produce unpleasant odors and contaminate molds.

Furthermore, crosslinked polymer foams are not recyclable because they are thermoset (rather than thermoplastic). Moreover, thermoset crosslinked polymer foam beads cannot be fused together to form a uniform sintered foam structure, such as a foam midsole. Consequently, crosslinked polymer foams are not traditionally prepared using a foam bead process, which utilizes a physical blowing agent.

The art recognizes the need for a polyolefin foam bead, and further a propylene-based polymer foam bead, that exhibits suitable density for foam sole and foam midsole applications. The art also recognizes the need for a polyolefin sintered foam structure, and further a propylene-based polymer sintered foam structure, that exhibits suitable density for foam sole and foam midsole applications. The art further recognizes the need for a polyolefin sintered foam structure, and further a propylene-based polymer sintered foam structure, that exhibits suitable shrinkage for foam sole and foam midsole applications.

SUMMARY

The instant disclosure provides a foam bead. The foam bead contains at least one of the following components: (A) a block composite; and/or (B) a crystalline block composite.

The instant disclosure also provides a sintered foam structure. The sintered foam structure is formed from a composition comprising at least one of the following components: (A) a block composite; and/or (B) a crystalline block composite.

DEFINITIONS

Figure 1:
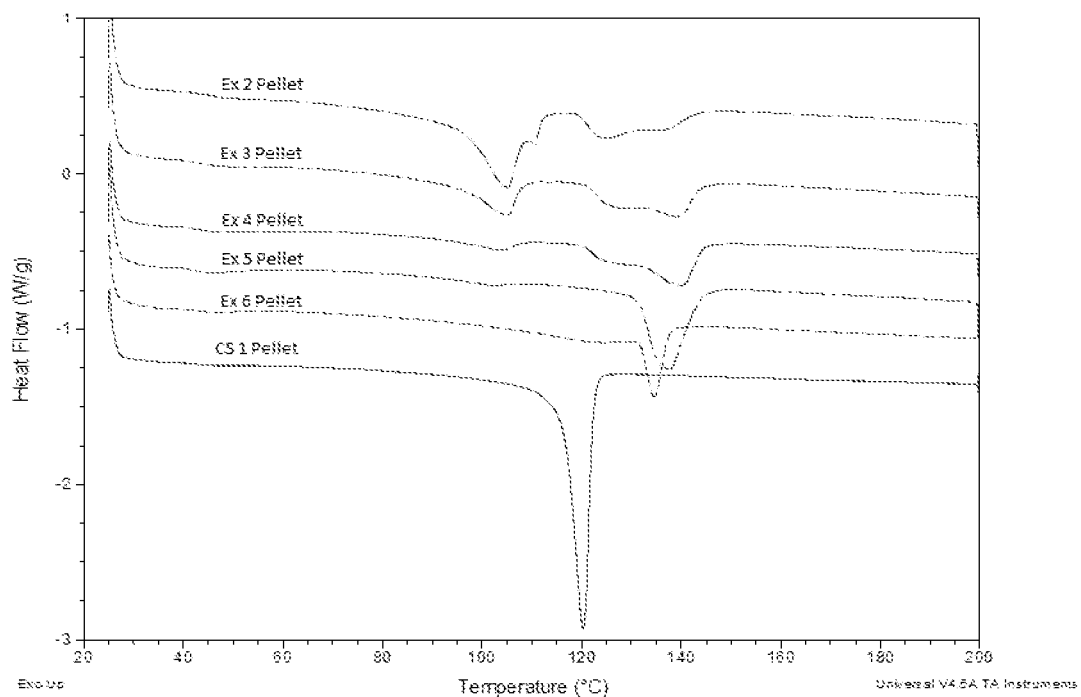
FIG. 1 is a Differential Scanning calorimetry (DSC) heating curve for the sample pellets in accordance with an embodiment of the present disclosure.

Any reference to the Periodic Table of Elements is that as published by CRC Press, Inc., 1990-1991. Reference to a group of elements in this table is by the new notation for numbering groups. For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art. The numerical ranges disclosed herein include all values from, and including, the lower and upper value. For ranges containing explicit values (e.g., 1 or 2; or 3 to 5; or 6; or 7), any subrange between any two explicit values is included (e.g., 1 to 2; 2 to 6; 5 to 7; 3 to 7; 5 to 6; etc.). Unless stated to the contrary, implicit from the context, or customary in the art, all parts and percents are based on weight and all test methods are current as of the filing date of this disclosure.

The term "block copolymer" or "segmented copolymer" refers to a polymer comprising two or more chemically distinct regions or segments (referred to as "blocks") joined in a linear manner, that is, a polymer comprising chemically differentiated units which are joined (covalently bonded) end-to-end with respect to polymerized functionality, rather than in pendent or grafted fashion. In an embodiment, the blocks differ in the amount or type of comonomer incorporated therein, the density, the amount of crystallinity, the type of crystallinity (e.g. polyethylene versus polypropylene), the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The block copolymers are characterized by unique distributions of both polymer polydispersity (PDI or Mw/Mn) and block length distribution, due to the effect of shuttling agent(s) in combination with the catalyst(s) employed in their preparation.

A "blowing agent" is a substance that is capable of producing a cellular structure in the composition via a foaming process.

The term "composition" refers to a mixture of materials which comprise the composition, as well as reaction products and decomposition products formed from the materials of the composition.

The terms "comprising," "including," "having" and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed.

An "ethylene-based polymer" or "ethylene polymer" is a polymer that contains a majority amount of polymerized ethylene based on the weight of the polymer, and, optionally, may comprise at least one comonomer. An "ethylene-based interpolymer" is an interpolymer that contains, in polymerized form, a majority amount of ethylene, based on the weight of the interpolymer, and at least one comonomer. Preferably, the ethylene-based interpolymer is a random interpolymer (i.e., comprises a random distribution of it monomeric constituents). A nonlimiting example of a suitable ethylene-based interpolymer is an ethylene plastomer/elastomer.

An "ethylene/α-olefin interpolymer" is an interpolymer that contains a majority amount of polymerized ethylene, based on the weight of the interpolymer, and at least one α-olefin. An "ethylene/α-olefin copolymer" is an interpolymer that contains a majority amount of polymerized ethylene, based on the weight of the copolymer, and an α-olefin, as the only two monomer types.

The term "foam bead," as used herein, refers to a foamed particle, formed by saturating a polymer particle (for example, pellet, granular particles, preferably pellet), in the presence of a blowing agent such as an inert gas (for example, $CO_2$ or $N_2$), and at a temperature within ±30° C., further within ±25° C., and further within ±20° C., of the highest melting temperature (Tm) of the polymer particle, and at a pressure from 50 Bar to 200 Bar. The saturation typically occurs for a time, such that the diameter (the as longest dimension) of the polymer particle increases by at least 50%, or at least 60%, or at least 70%, or at least 80%, or at least 90%, or at least 100%, relative to its original diameter before foaming. Typically, a saturation time is from 0.1 to 2.0 hours, or from 10 min, or 15 min, or 20 min, or 30 min to 60 min, or 90 min, or 120 min. Here, the "highest melting temperature (Tm)" refers to the Differential Scanning calorimetry (DSC) melting peak having the highest peak temperature.

Here, the "highest melting temperature (Tm)" refers to the Differential Scanning calorimetry (DSC) melting peak having the highest peak temperature.

An "interpolymer" is a polymer prepared by the polymerization of at least two different types of monomers. The generic term interpolymer thus includes copolymers (employed to refer to polymers prepared from two different types of monomers), and polymers prepared from more than two different types of monomers.

An "olefin-based polymer" or "polyolefin" is a polymer that contains a majority amount of polymerized olefin monomer, for example, ethylene or propylene, (based on the weight of the polymer), and optionally, may contain at least one comonomer. Nonlimiting examples of an olefin-based polymer include an ethylene-based polymer and a propylene-based polymer.

A "polymer" is a polymeric compound prepared by polymerizing monomers, whether of the same or a different type. The generic term polymer thus embraces the term "homopolymer" (employed to refer to polymers prepared from only one type of monomer, with the understanding that trace amounts of impurities can be incorporated into the polymer structure), and the term "interpolymer," as defined hereinafter. Trace amounts of impurities, for example, catalyst residues, may be incorporated into and/or within the polymer.

A "propylene-based polymer" is a polymer that contains a majority amount of polymerized propylene based on the weight of the polymer, and, optionally, may comprise at least one comonomer.

The term, "sintered foam structure," refers to a foam structure formed by compressing foam beads, as described herein, typically under a vacuum, in the presence of a heating source. In an embodiment, the heating source is steam at a steam pressure equal to, or greater than, 0.5 Bar. The filling of a mold is typically done using a vacuum, such as at a pressure of less than 1 atm.

The term "sintering" refers to a process of compacting and forming a mass of fused foam beads by heat and/or pressure into a structure, without melting the beads to the point of liquefaction.

DETAILED DESCRIPTION

The instant disclosure provides a foam bead. The foam bead includes at least one of the following components: (A) a block composite and/or (B) a crystalline block composite.

A foam bead may comprise a combination of two or more embodiments as described herein.

In an embodiment, the present foam bead further includes (C) one or more optional additives.

(A) Block Composite (BC)

The present foam bead may include (A) a block composite (BC). The term "block composite" ("BC") refers to a polymer containing three polymer components:
  (i) an ethylene-based polymer (EP) having an ethylene content from 10 mol % to less than 90 mol % (a soft copolymer), based on the total moles of polymerized monomer units in the ethylene-based polymer (EP);
  (ii) an alpha-olefin-based polymer (AOP) having an alpha-olefin content of greater than 90 mol % (a hard copolymer), based on the total moles of polymerized monomer units in the alpha-olefin-based polymer (AOP); and
  (iii) a block copolymer having an ethylene block (EB) and an alpha-olefin block (AOB); wherein the ethylene block (soft block/soft segment) contains more polymerized ethylene than the alpha-olefin block (hard block/hard segment), and wherein the ethylene block (EB) has the same or similar Tm as the ethylene-based polymer (EP) of component (i), and wherein the alpha-olefin block (AOB) has the same or similar Tm as the alpha-olefin-based polymer (AOP) of component (ii); and wherein the phrase "same or similar" refers to an absolute Tm differential of less than or equal to 5° C., further less than or equal to 4° C., further less than or equal to 3° C., or further less than or equal to 2° C.

Nonlimiting examples of suitable alpha-olefins include, for example, $C_3$-$C_{10}$ α-olefins such as $C_3$, $C_4$, $C_5$, $C_6$ and $C_8$ α-olefins. In certain embodiments, the alpha-olefin is propylene. In further embodiments, the AOB and EB may be an iPP-EP diblock copolymer.

In one embodiment, the BC includes:
  (i) an ethylene based polymer (EP) having an ethylene content of from 10 mol % to less than 90 mol % (a soft copolymer);
  (ii) an alpha-olefin based polymer (AOP) having an alpha-olefin content of greater than 90 mol % (a hard copolymer); and
  (iii) a block copolymer having an ethylene block (EB) and an alpha-olefin block (AOB); wherein the ethylene block (soft block/soft segment) of the block copolymer has the same composition as the ethylene based polymer of component (i) of the block composite and the alpha-olefin block (hard block/hard segment) of the block copolymer has the same composition as the alpha-olefin based polymer of component (ii) of the block composite. The term "same composition" refers to two components that have identical monomer and comonomer contents, identical structures, and identical physical properties. The compositional split between the amount of ethylene based polymer and alpha-olefin based polymer will be the same, or essentially the same, as that between the corresponding blocks in the block copolymer. Nonlimiting examples of suitable α-olefins include, for example, $C_3$-$C_{10}$ α-olefins such as $C_3$, $C_4$, $C_5$, $C_6$ and $C_8$ α-olefins. In certain embodiments, the α-olefin is propylene. In further embodiments, the AOB and EB may be an iPP-EP diblock copolymer.

In the BC, "hard" blocks (also referred to as hard segments) refer to highly crystalline blocks of polymerized units in which a monomer (e.g., propylene) is present in an amount greater than or equal to 90 mol %. In other words, the comonomer content (e.g., ethylene content) in the hard blocks/segments is less than or equal to 10 mol %. In some embodiments, the hard segments comprise all or substantially all propylene units (such as an iPP—isotactic polypropylene—copolymer or homopolymer block). "Soft" blocks (also referred to as soft segments), on the other hand, refer to amorphous, substantially amorphous, or elastomeric blocks of polymerized units in which a monomer (e.g., ethylene) is present in an amount from 10 mol % to less than 90 mol %. In other words, the comonomer content (e.g., propylene content) in the soft blocks/segments is greater than 10 mol %.

In an embodiment, the BC has a total ethylene content from 25 wt %, or 30 wt % to 50 wt %, or 55 wt %, or 60 wt %, or 70 wt %, based on the total weight of the BC. The remainder of the total weight of the BC may be accounted for by units derived from at least one $C_3$-$C_{10}$ α-olefin, such as propylene. In an embodiment, the BC is a propylene-based polymer containing greater than, or equal to, 50 wt % units derived from propylene, based on the total weight of the BC.

In an embodiment, the BC includes (i) a soft copolymer having an ethylene content that is from 10 mol % to less than 90 mol %, (ii) a hard copolymer having a propylene content that is greater than or equal to 90 mol %, and (iii) a block copolymer (e.g., a diblock) having a soft block (i.e., soft segment) and a hard block (i.e., hard segment), wherein the hard block of the block copolymer is the same composition as the hard copolymer of the block composite and the soft block of the block copolymer is the same composition as the soft copolymer of the block composite. The compositional split between the amount of soft copolymer and hard copolymer will be the same, or essentially the same, as that between the corresponding blocks in the block copolymer.

In an embodiment, the BC includes (i) a soft copolymer having an ethylene content that is greater than 10 wt % and less than 86 wt %, (ii) a hard copolymer having a propylene content that is greater than 80 wt % and up to 100 wt %, and (iii) a block copolymer (e.g., a diblock) having a soft block (i.e., soft segment) and a hard block (i.e., hard segment), wherein the hard block of the block copolymer is the same composition as the hard copolymer of the BC and the soft block of the block copolymer is the same composition as the soft copolymer of the BC. The compositional split between the amount of soft copolymer and hard copolymer will be the same, or essentially the same, as that between the corresponding blocks in the block copolymer.

In the BC, the hard blocks refer to highly crystalline blocks of polymerized α-olefin units (e.g., propylene). In the hard blocks, the monomer (i.e., propylene) may be present in an amount greater than 80 wt % (e.g., greater than 85 wt %, greater than 90 wt %, and/or greater than 95 wt %), based on the weight of the hard block. The remainder of the hard block may be the comonomer (e.g., ethylene) in an amount of less than 20 wt % (e.g., less than 15 wt % and/or less than 10 wt %), based on the weight of the hard block. In an embodiment, the hard blocks comprise all or substantially all propylene units, such as an iPP (isotactic) homopolymer block or an iPP copolymer block with less than 10 wt % of ethylene. The "soft blocks" refer to amorphous, substantially amorphous, or elastomer blocks of polymerized ethylene units. In the soft blocks, the monomer (i.e., ethylene) may be present in an amount of greater than 20 wt % and less than 90 wt % (e.g., from 40 wt % to 89 wt %, from 45 wt % to 85 wt %, and/or from 50 wt % to 80 wt %), based on the weight of the soft block. The remainder of the soft block may be the comonomer (e.g., propylene).

In an embodiment, the block composite includes a block copolymer having from 30 wt % to 70 wt % hard block and from 30 wt % to 70 wt % soft block. In other words, the block composite includes a block copolymer having from 30 wt % to 70 wt % hard block and from 30 wt % to 70 wt % soft block, based on the total weight of the block copolymer.

In an embodiment, the block copolymer of the BC has the formula (EP)—(iPP), in which EP represents the soft block of polymerized ethylene and propylene monomeric units (e.g., from 50 wt % to 80 wt % of ethylene and remainder propylene) and iPP represents a hard block of isotactic propylene homopolymer or isotactic propylene copolymer (e.g., less than 10 wt % of ethylene and remainder propylene).

An exemplary measurement of the relative amount of the block copolymer is referred to as the Block Composite Index (BCI), as further discussed below. The BCI for the BC is greater than 0 and less than 1.0. In an embodiment, the BC has a Block Composite Index (BCI) from greater than zero, or 0.1, or 0.2 to 0.3, or 0.4, or 0.5, or 0.8, or 0.9, or 1.0. In another embodiment, the BC has a BCI from greater than zero to 0.4, or from 0.1 to 0.3, or 0.4. In another embodiment, the BC has a BCI from greater than 0.4 to 1.0, or from 0.4, or 0.5, or 0.6 to 0.7, or 0.9, or 1.0. In another embodiment, the BC has a BCI from 0.7, or 0.8, or 0.9 to 1.0.

In an embodiment, the BC has a weight average molecular weight (Mw) from 10,000 g/mol, or 35,000 g/mol, or 50,000 g/mol, or 80,000 g/mol to 200,000 g/mol, or 500,000 g/mol, or 1,000,000 g/mol, or 2,500,000 g/mol. In an embodiment, the molecular weight distribution (Mw/Mn) or polydispersity of the BC is less than 5, or from 1, or 1.5, or 2 to 3, or 4, or 5.

In an embodiment, the melt flow rate (MFR) (230° C./2.16 kg) of the BC is from 0.1 g/10 min, or 3 g/10 min, or 6 g/10 min to 10 g/10 min, or 15 g/10 min, or 20 g/10 min, or 60 g/10 min, or 100 g/10 min, or 1,000 g/10 min.

In an embodiment, the density of the BC is from 0.850 g/cc, or 0.860 g/cc, or 0.865 g/cc to 0.890 g/cc, or 0.895 g/cc, or 0.900 g/cc, or 0.910 g/cc, or 0.920 g/cc.

In an embodiment, the BC exhibits two melting peaks, a first melting peak ($Tm1^{BC}$) and a second melting peak ($Tm2^{BC}$). In an embodiment, the BC has a second melting peak ($Tm2^{BC}$) that is greater than 35° C., or greater than 50° C., or greater than 90° C., or greater than 100° C., or greater than 120° C., or from 40° C., or 100° C., or 120° C. to 150° C.

In an embodiment, the difference between $Tm1^{BC}$ and $Tm2^{BC}$ is greater than, or equal to, 40° C. In another embodiment, the difference between $Tm1^{BC}$ and $Tm2^{BC}$ is greater than 20° C., or greater than 40° C., or greater than 50° C., or greater than 60° C., or greater than 70° C., or greater than 80° C.

In an embodiment, the BC contains: (i) from 0.5 wt %, or 10 wt %, or 20 wt %, or 30 wt % to 40 wt %, or 50 wt %, or 60 wt %, or 70 wt %, or 79 wt %, or 95 wt % EP; (ii) from 0.5 wt %, or 10 wt %, or 20 wt %, or 30 wt % to 40 wt %, or 50 wt %, or 60 wt %, or 70 wt %, or 79 wt %, or 95 wt % AOP; and (iii) from 5 wt %, or 50 wt % to 99 wt % block copolymer, based on total weight of the BC.

The sum of the weight percents of EP, AOP and block copolymer equals 100%.

In an embodiment, the (iii) block copolymer of the BC contains from 5 wt %, or 10 wt %, or 25 wt %, or 30 wt % to 70 wt %, or 75 wt %, or 90 wt %, or 95 wt % EB; and from 95 wt %, or 90 wt %, or 75 wt %, or 70 wt % to 30 wt %, or 25 wt %, or 10 wt %, or 5 wt % AOB.

In an embodiment, the BC contains, consists essentially of, or consists of: (i) from 0.5 wt %, or 10 wt %, or 20 wt %, or 30 wt % to 40 wt %, or 50 wt %, or 60 wt %, or 70 wt %, or 79 wt %, or 95 wt % EP; (ii) from 0.5 wt %, or 10 wt %, or 20 wt %, or 30 wt % to 40 wt %, or 50 wt %, or 60 wt %, or 70 wt %, or 79 wt %, or 95 wt % iPP; and (iii) from 5 wt %, or 10 wt %, or 25 wt %, or 30 wt %, or 50 wt % to 70 wt %, or 80 wt %, or 90 wt %, or 95 wt %, or 99 wt % block copolymer, based on total weight of the BC; and the block composite has one, some, or all of the following properties:

(a) the EP contains from 10 mol %, or 20 mol %, or 30 mol %, or 40 mol %, or 50 mol %, or 60 mol %, or 65 mol %, or 70 mol %, or 73 mol % to 75 mol %, or 80 mol %, or 85 mol %, or 89 mol % polymerized ethylene units and a reciprocal amount of polymerized propylene units, or from 11 mol %, or 15 mol %, or 20 mol %, or 25 mol % to 27 mol %, or 30 mol %, or 35 mol %, or 40 mol %, or 50 mol %, or 60 mol %, or 70 mol %, or 80 mol %, or 90 mol % polymerized propylene units, based on the total number of moles of the EP; and/or (b) the iPP contains from 100 wt %, or 99.5 wt %, or 99 wt % to 95 wt %, or 90 wt %, or 85 wt %, or 80 wt %, or 75 wt %, or 70 wt %, or 65 wt %, or 60 wt %, or 55 wt % polymerized propylene and a reciprocal amount of ethylene, or from 0 wt %, or 0.5 wt % to 1 wt %, or 5 wt %, or 10 wt %, or 15 wt %, or 20 wt %, or 25 wt %, or 30 wt %, or 35 wt %, or 40 wt %, or 45 wt % polymerized ethylene, based on the total weight of the iPP; and/or (c) the block copolymer contains from 5 wt %, or 10 wt %, or 25 wt %, or 30 wt % to 70 wt %, or 75 wt %, or 90 wt %, or 95 wt % EB and a reciprocal amount, or from 95 wt %, or 90 wt %, or 75 wt %, or 70 wt % to 30 wt %, or 25 wt %, or 10 wt %, or 5 wt % iPP blocks, based on the total weight of the block copolymer; and/or (d) a BCI from 0.1, or 0.2, or 0.3, or 0.4 to 0.5, or 0.6, or 0.7, or 0.8, or 0.9, or 1.0; and/or (e) a melt flow rate (MFR) from 0.1 g/10 min, or 5 g/10 min, or 10 g/10 min, or 15 g/10 min, or 18 g/10 min to 20 g/10 min, or 30 g/10 min, or 50 g/10 min, or 1,000 g/10 min; and/or (f) a weight average molecular weight (Mw) from 50,000 g/mol, or 80,000 g/mol, or 100,000 g/mol to 150,000 g/mol, or 200,000 g/mol, or 300,000 g/mol, or 500,000 g/mol, or 1,000,000 g/mol; and/or (g) a Mw/Mn from 1.0, or 1.5, or 2.0, or 2.5, or 3.0, or 3.5, or 3.7 to 3.8, or 4.0, or 4.5, or 5.0; and/or (h) a heat of fusion (or melt enthalpy) from 20 Joules per gram (J/g), or 25 J/g, or 30 J/g, or 35 J/g, or 50 J/g, or 60 J/g, or 70 J/g, or 75 J/g, or 80 J/g to 85 J/g, or 90 J/g, or 95 J/g, or 100 J/g, or 125 J/g; and/or (i) a crystallization temperature, Tc, from 70° C., or 75° C., or 80° C., or 85° C. to 90° C., or 95° C., or 100° C.; and/or (j) a first peak $Tm1^{BC}$ from 20° C., or 25° C., or 35° C., or 40° C. to 45° C., or 50° C., or 60° C.; and/or (k) a second peak $Tm2^{BC}$ from 100° C., or 110° C., or 120° C., or 125° C. to 136° C., or 140° C., or 145° C., or 150° C.; and/or (l) a difference between $Tm1^{BC}$ and $Tm2^{BC}$ that is greater than 20° C., or greater than 40° C., or greater than 50° C., or greater than 60° C.; and/or (m) a total ethylene content from 20 wt %, or 25 wt %, or 30 wt %, or 33 wt % to 35 wt %, or 40 wt %, or 45 wt %, or 50 wt %, based on the total weight of the BC.

In a further embodiment, the BC has all of the above properties (a)-(m).

In an embodiment, the BC contains, consists essentially of, or consists of: (i) an ethylene-based polymer having an ethylene content of from 10 mol % to less than 90 mol %; (ii) a propylene-based polymer having a propylene content of greater than 90 mol %; and (iii) a block copolymer comprising an ethylene block and a propylene block; wherein the ethylene block of the (iii) block copolymer has the same composition as the (i) ethylene-based polymer; and the propylene block of the (iii) block copolymer has the same composition as the (ii) propylene-based polymer; and the BC has one, some, or all, of the following properties:

(a) a melt flow rate (MFR) from 0.1 g/10 min, or 5 g/10 min, or 10 g/10 min, or 15 g/10 min, or 18 g/10 min to 20 g/10 min, or 30 g/10 min, or 50 g/10 min, or 1,000 g/10 min; and/or (b) exhibits two melting peaks; and/or (c) a first peak $Tm1^{BC}$ from 20° C., or 25° C., or 35° C., or 40° C. to 45° C., or 50° C., or 60° C.; and/or (d) a second peak $Tm2^{BC}$ from 100° C., or 110° C., or 120° C., or 125° C. to 136° C., or 140° C., or 145° C., or 150° C.; and/or (e) a difference between $Tm1^{BC}$ and $Tm2^{BC}$ that is greater than 20° C., or greater than 40° C., or greater than 50° C., or greater than 60° C.

In a further embodiment, the BC has all of the above properties (a)-(e).

The block composite, may comprise two or more embodiments discussed herein.

(B) Crystalline Block Composite (CBC)

The present foam bead may include (B) a crystalline block composite (CBC). The term "crystalline block composite" ("CBC") refers to polymers containing three polymer components:

(i) a crystalline ethylene based polymer (CEP) having an ethylene content of greater than, or equal to, 90 mol % (also referred to herein as a soft polymer of CBC), based on the total moles of polymerized monomer units in the crystalline ethylene-based polymer (CEP);

(ii) a crystalline alpha-olefin based polymer (CAOP) having an alpha-olefin content of greater than 90 mol % (also referred to herein as a hard polymer of the CBC), based on the total moles of polymerized monomer units in the crystalline alpha-olefin-based polymer (CAOP); and (iii) a block copolymer comprising a crystalline ethylene block (CEB) and a crystalline alpha-olefin block (CAOB); and wherein the crystalline ethylene block has the same or similar Tm as the crystalline ethylene-based polymer (CEP) of component (i), and wherein the crystalline alpha-olefin block has the same or similar Tm as the crystalline alpha-olefin-based polymer (CAOP) of component (ii); and wherein the phrase "same or similar" refers to an absolute Tm differential of less than or equal to 5° C., further less than or equal to 4° C., further less than or equal to 3° C., further less than or equal to 2° C.

In one embodiment, the "crystalline block composite" ("CBC") comprises:

(i) a crystalline ethylene based polymer (CEP) having an ethylene content of greater than, or equal to, 90 mol % (also referred to herein as a soft polymer);

(ii) a crystalline alpha-olefin based polymer (CAOP) having an alpha-olefin content of greater than 90 mol % (also referred to herein as a hard polymer); and (iii) a block copolymer comprising a crystalline ethylene block (CEB) and a crystalline alpha-olefin block (CAOB);

wherein the crystalline ethylene block (CEB) (soft block/soft segment) of the block copolymer has the same composition as the crystalline ethylene based polymer (CEP) of component (i) of the block composite and the crystalline alpha-olefin block (CAOB) (hard block/hard segment) of the block copolymer has the same composition as the crystalline alpha-olefin based polymer (CAOP) of component (ii) of the block composite. The compositional split between the amount of CEP and CAOP will be the same, or essentially the same, as that between the corresponding blocks in the block copolymer. When produced in a continuous process, the CBC has a polydispersity index (PDI) from 1.7, or 1.8 to 3.5, or 5, or 10, or 15. Such CBC is described in, for example, US Patent Application Publication Nos. 2011/0313106, 2011/0313108 and 2011/0313108, all published on 22 Dec. 2011, and in PCT Publication No. WO2014/043522A1, published 20 Mar. 2014, each of which are incorporated herein by reference with respect to descriptions of CBC, processes to make CBC, and methods of analyzing CBC. Nonlimiting examples of suitable α-olefins include, for example, $C_3$-$C_{10}$ α-olefins such as $C_3$, $C_4$, $C_5$, $C_6$ and $C_8$ α-olefins. In certain embodiments, the α-olefin is propylene.

The "crystalline ethylene based polymer" ("CEP") contains least 90 mol % polymerized ethylene units in which any comonomer content is 10 mol % or less, or from 0 mol % to 5 mol %, or 7 mol %, or 10 mol %. The crystalline ethylene based polymer has corresponding melting points that are 75° C. and above, or 90° C. and above, or 100° C. and above.

In the CBC, the "crystalline alpha-olefin based polymer" ("CAOP") is a highly crystalline polymer containing polymerized α-olefin units in which the monomer (e.g., propylene) is present in an amount greater than 90 mol %, or greater than 93 mol %, or greater than 95 mol %, or greater than 98 mol %, based on the total weight of the crystalline α-olefin based polymer (propylene). In an embodiment, the polymerized α-olefin unit is polypropylene. The comonomer (e.g., ethylene) content in the CAOP is less than 10 mol %, or less than 7 mol %, or less than 5 mol %, or less than 2 mol %. CAOPs with propylene crystallinity have corresponding melting points that are 80° C. and above, or 100° C. and above, or 115° C. and above, or 120° C. and above. In an embodiment, the CAOP comprises all, or substantially all, propylene units.

Nonlimiting examples of other suitable α-olefin units (in addition to propylene) that may be used in the CAOP are those that contain 4 to 10 carbon atoms, such as 1-butene, 1-hexene, 4-methyl-1-pentene and 1-octene. Nonlimiting examples of suitable diolefins include isoprene, butadiene, 1,4-pentadiene, 1,4-hexadiene, 1,5-hexadiene, 1,7-octadiene, 1, 9-decadiene, dicyclopentadiene, methylene-norbornene, 5-ethylidene-2-norbornene, or the like, and combinations containing at least one of the foregoing α-olefin units.

The (iii) block copolymer of the CBC contains crystalline ethylene block (CEB) and a crystalline alpha olefin block (CAOB). In the crystalline ethylene block (CEB), ethylene monomer is present in an amount greater than 90 mol %, or greater than 93 mol %, or greater than 95 mol %, or greater than 90 mol %, based on the total number of moles of the CEB. In an embodiment, the crystalline ethylene block (CEB) polymer is polyethylene. The polyethylene is present in an amount greater than 90 mol %, or greater than 93 mol %, or greater than 95 mol %, based on the total number of moles of the CEB. If any comonomer is present in the CEB, it is present in an amount of less than 10 mol %, or less than 5 mol %, based on the total number of moles of the CEB.

The CAOB includes a polypropylene block that is copolymerized with other α-olefin units that contain 4 to 10 carbon atoms. Nonlimiting examples of suitable α-olefins are provided above. The polypropylene is present in the CAOB in an amount of greater than or equal to 90 mol %, or greater than 93 mol %, or greater than 95 mol %, based on the total number of moles of the CAOB. The comonomer content in the CAOB is less than 10 mol %, or less than 7 mol %, or less than 5 mol percent, based on the total number of moles in the CAOB. A CAOB with propylene crystallinity has a corresponding melting point that is 80° C. and above, or 100° C. and above, or 115° C. and above, or 120° C. and above. In an embodiment, the CAOB comprises all, or substantially all, propylene units.

In an embodiment, the CBC contains propylene, 1-butene or 4-methyl-1-pentene and one or more comonomers. In a further embodiment, the CBC contains, in polymerized form, propylene and ethylene and/or one or more $C_{4\text{-}20}$ α-olefin comonomers, and/or one or more additional copolymerizable comonomers, or the CBC contains 4-methyl-1-pentene and ethylene and/or one or more $C_{4\text{-}20}$ α-olefin comonomers, or the CBC contains 1-butene and ethylene, propylene and/or one or more $C_5$-$C_{20}$ α-olefin comonomers and/or one or more additional copolymerizable comonomers. Additional suitable comonomers are selected from diolefins, cyclic olefins, and cyclic diolefins, halogenated vinyl compounds, and vinylidene aromatic compounds. In an embodiment, the monomer is propylene and the comonomer is ethylene.

In an embodiment, the CBC is a propylene-based polymer containing greater than, or equal to, 50 wt % units derived from propylene, based on the total weight of the CBC.

Comonomer content in the CBC may be measured using any suitable technique, such as techniques based on nuclear magnetic resonance (NMR) spectroscopy.

In an embodiment, the CBC exhibits two melting peaks, a first melting peak ($Tm1^{CBC}$) and a second melting peak ($Tm2^{CBC}$). In an embodiment, the CBC has a second melting peak ($Tm2^{CBC}$) that is greater than 100° C., or greater than 120° C., or greater than 125° C. In an embodiment, the CBC has a second melting peak ($Tm2^{CBC}$) from 100° C., or 120° C., or 125° C. to 130° C., or 250° C.

In an embodiment, the difference between $Tm1^{CBC}$ and $Tm2^{CBC}$ is greater than, or equal to , 20° C., or greater than, or equal to, 40° C. In another embodiment, the difference between $Tm1^{CBC}$ and $Tm2^{CBC}$ is greater than 20° C., or greater than 40° C., or greater than 50° C., or greater than 60° C.

In an embodiment, the CBC has a melt flow rate (MFR) from 0.1 g/10 min to 30 g/10 min, or 50 g/10 min, or 1,000 g/10 min.

In an embodiment, the CBC has a weight average molecular weight (Mw) from 10,000 g/mol, or 50,000 g/mol to 200,000 g/mol, or 1,000,000 g/mol, or 2,500,000 g/mol.

In an embodiment, the CBC has a Crystalline Block Composite Index (CBCI) from greater than zero, or 0.1 or 0.2, or 0.3 to 0.4, or 0.5, or 0.6, or 0.7, or 0.8, or 0.9, or 1.0. In another embodiment, the BC has a BCI from greater than zero to 0.4, or from 0.1 to 0.3, or 0.4. In another embodiment, the CBC has a CBCI from greater than 0.4 to 1.0, or from 0.4, or 0.5, or 0.6 to 0.7, or 0.9, or 1.0. In another embodiment, the CBC has a CBCI from 0.7, or 0.8, or 0.9 to 1.0.

In an embodiment, the CBC contains (i) from 0.5 wt % to 79 wt %, or 95 wt % CEP; (ii) from 0.5 wt % to 79 wt %, or 95 wt % CAOP; and (iii) from 5 wt %, or 50 wt % to 99 wt % block copolymer, based on total weight of crystalline block composite.

The sum of the weight percents of CEP, CAOP and block copolymer equals 100%.

In an embodiment, the (iii) block copolymer of the CBC contains from 5 wt %, or 10 wt %, or 25 wt %, or 30 wt % to 70 wt %, or 75 wt %, or 90 wt %, or 95 wt % CEB; and from 95 wt %, or 90 wt %, or 75 wt %, or 70 wt % to 30 wt %, or 25 wt %, or 10 wt %, or 5 wt % CAOB.

In an embodiment, the CBC contains (i) a CEP that is a crystalline ethylene/propylene copolymer (CEP); (ii) a CAOP that is an isotactic crystalline propylene homopolymer (iPP); and (iii) a block copolymer containing an iPP block (CAOB) and an EP block (CEB); wherein the block copolymer includes a diblock with the Formula (2): (CEP)-(iPP) Formula (2).

In an embodiment, the CBC contains, consists essentially of, or consists of: (i) from 0.5 wt %, or 10 wt %, or 20 wt %, or 30 wt % to 40 wt %, or 50 wt %, or 60 wt %, or 70 wt %, or 79 wt %, or 95 wt % CEP; (ii) from 0.5 wt %, or 10 wt %, or 20 wt %, or 30 wt % to 40 wt %, or 50 wt %, or 60 wt %, or 70 wt %, or 79 wt %, or 95 wt % iPP; and (iii) from 5 wt %, or 10 wt %, or 25 wt %, or 30 wt % or 50 wt % to 70 wt %, or 80 wt %, or 90 wt %, or 95 wt %, or 99 wt % block copolymer, based on total weight of the CBC; and the crystalline block composite has one, some, or all of the following properties:

(a) the CEP contains from 85 wt %, or 89 wt % to 92 wt %, or 95 wt %, or 99 wt % ethylene and a reciprocal amount of propylene, or from 1 wt %, or 5 wt %, or 8 wt % to 11 wt %, or 15 wt % propylene, based on the total weight of the CEP; and/or (b) the CEP contains from 90 mol %, or 91 mol %, or 92 mol % to 95 mol %, or 96 mol %, or 97 mol %, or 98 mol %, or 99 mol % polymerized ethylene units and a reciprocal amount of polymerized propylene units, or from 1 mol %, or 2 mol %, or 3 mol %, or 4 mol %, or 5 mol % to 8 mol %, or 9 mol %, or 10 mol % polymerized propylene units, based on the total number of moles of the CEP; and/or (c) the iPP contains from 100 wt %, or 99.5 wt %, or 99 wt % to 95 wt %, or 90 wt %, or 85 wt %, or 80 wt %, or 75 wt %, or 70 wt %, or 65 wt %, or 60 wt %, or 55 wt % propylene and a reciprocal amount of ethylene, or from 0 wt %, or 0.5 wt % to 1 wt %, or 5 wt %, or 10 wt %, or 15 wt %, or 20 wt %, or 25 wt %, or 30 wt %, or 35 wt %, or 40 wt %, or 45 wt % ethylene, based on the total weight of the iPP; and/or (d) the iPP contains from 90 mol %, or 91 mol %, or 92 mol %, or 93 mol %, or 94 mol %, or 95 mol %, or 96 mol %, or 97 mol %, or 98 mol % to 99 mol % polymerized propylene units and a reciprocal amount of polymerized ethylene units, or from 1 mol % to 2 mol %, or 3 mol %, or 4 mol %, or 5 mol %, or 6 mol %, or 7 mol %, or 8 mol %, or 9 mol %, or 10 mol % polymerized ethylene units, based on the total number of moles of the iPP; and/or (e) the block copolymer contains from 5 wt %, or 10 wt %, or 25 wt %, or 30 wt % to 50 wt %, or 70 wt %, or 75 wt %, or 90 wt %, or 95 wt % EB and a reciprocal amount, or from 95 wt %, or 90 wt %, or 75 wt %, or 70 wt %, or 50 wt % to 30 wt %, or 25 wt %, or 10 wt %, or 5 wt % iPP blocks, based on the total weight of the block copolymer; and/or (f) a CBCI from 0.1, or 0.2, or 0.3, or 0.4, or 0.5, or 0.6 to 0.7, or 0.8, or 0.9, or 1.0; and/or (g) a melt flow rate (MFR) (230° C./2.16 kg) from 0.1 g/10 min, or 5 g/10 min to 10 g/10 min, or 15 g/10 min, or 20 g/10 min, or 40 g/10 min, or 50 g/10 min, or 1,000 g/10 min; and/or (h) a weight average molecular weight (Mw) from 50,000 g/mol, or 70,000 g/mol, or 80,000 g/mol, or 100,000 g/mol to 130,000 g/mol, or 150,000 g/mol, or 200,000 g/mol, or 300,000 g/mol, or 500,000 g/mol, or 1,000,000 g/mol; and/or (i) a Mw/Mn from 1.0, or 1.5, or 2.0, or 2.5 to 3.0, or 3.5, or 3.8, or 4.0, or 4.5, or 5.0; and/or (j) a heat of fusion (or melt enthalpy) from 20 J/g, or 25 J/g, or 30 J/g, or 50 J/g, or 60 J/g, or 70 J/g, or 75 J/g, or 80 J/g, or 85 J/g, or 90 J/g to 100 J/g, or 110 J/g, or 115 J/g, or 125 J/g; and/or (k) a crystallization temperature, Tc, from 70° C., or 75° C., or 80° C., or 85° C. to 90° C., or 95° C., or 100° C.; and/or (l) a first peak $Tm1^{CBC}$ from 90° C., or 95° C., or 100° C., or 105° C. to 110° C., or 115° C., or 120° C., or 125° C., or 130° C., or 140° C., or 150° C.; and/or (m) a second peak $Tm2^{CBC}$ from 100° C., or 110° C., or 120° C., or 130° C. to 135° C., or 140° C., or 145° C., or 150° C.; and/or (n) a difference between $Tm1^{CBC}$ and $Tm2^{CBC}$ that is greater than 20° C., or greater than 40° C., or greater than 50° C., or greater than 60° C.; and/or (o) a total ethylene content from 20 wt %, or 25 wt %, or 28 wt % to 47 wt %, or 50 wt %, or 55 wt %, or 60 wt %, or 70 wt %, based on the total weight of the CBC.

In a further embodiment, the CBC has all of the above properties (a)-(o).

In an embodiment, the crystalline block composite contains, consists essentially of, or consists of: (i) a crystalline ethylene-based polymer having an ethylene content of greater than 90 mol %; (ii) a crystalline propylene-based polymer having a propylene content of greater than 90 mol %; and (iii) a block copolymer comprising a crystalline ethylene block and a crystalline propylene block; wherein the crystalline ethylene block of the (iii) block copolymer is the same composition as the (i) crystalline ethylene-based polymer; and the crystalline propylene block of the (iii) block copolymer is the same composition as the (ii) crystalline propylene-based polymer; and the CBC has one, some, or all, of the following properties:

(a) a melt flow rate (MFR) (230° C./2.16 kg) from 0.1 g/10 min, or 5 g/10 min to 10 g/10 min, or 15 g/10 min, or 20 g/10 min, or 40 g/10 min, or 50 g/10 min, or 1,000 g/10 min; and/or (b) exhibits two melting peaks; and/or (c) a first peak $Tm1^{CBC}$ from 90° C., or 95° C., or 100° C., or 105° C. to 110° C., or 115° C., or 120° C., or 125° C., or 130° C., or 140° C., or 150° C.; and/or (d) a second peak $Tm2^{CBC}$ from 100° C., or 110° C., or 120° C., or 130° C. to 135° C., or 140° C., or 145° C., or 150° C.; and/or (e) a difference between $Tm1^{CBC}$ and $Tm2^{CBC}$ that is greater than 20° C., or greater than 40° C., or greater than 50° C., or greater than 60° C.

In a further embodiment, the CBC has all of the above properties (a)-(e).

The crystalline block composite, may comprise two or more embodiments discussed herein.

It is understood that the sum of the components in each of the polymers disclosed herein, including the foregoing BC and CBC polymers, yields 100 mol %.

Polymerization of (A) Block Composite and (B) Crystalline Block Composite

The CBC and BC (collectively, "the composite component") may be differentiated from conventional, random copolymers, physical blends of polymers, and block copolymers prepared via sequential monomer addition. The composite component may be differentiated from random copolymers by characteristics such as higher melting temperatures for a comparable amount of comonomer, CBCI and BCI; from a physical blend by characteristics such as CBCI BCI, better tensile strength, improved fracture strength, finer morphology, improved optics, and/or greater impact strength at lower temperature; and from block copolymers prepared by sequential monomer addition by molecular weight distribution, rheology, shear thinning, rheology ratio, and in that there is block polydispersity. For example, the composite component includes a block copolymer having distinct regions or segments (referred to as "blocks") joined in a linear manner. The blocks differ, e.g., in the type of crystallinity such as polyethylene (PE) versus polypropylene (PP). The block copolymers can be linear or branched. When produced in a continuous process, the composite component has a PDI from 1.7, or 1.8 to 3.5, or 5, or 10 15. When produced in a batch or semi-batch process, the composite component has a PDI from 1.0, or 1.3, or 1.4 to 1.8, or 2.0, or 2.5, or 2.9.

The composite component includes the block copolymer possessing a most probable distribution of block lengths. The block copolymer contains 2 or 3 blocks or segments. In a process for making the polymers of the composite component, chain shuttling is used as a way to prolong the lifetime of a polymer chain such that a substantial fraction of the polymer chains exit at least the first reactor of a multiple reactor series or the first reactor zone in a multiple zoned reactor operating substantially under plug flow conditions in the form of polymer terminated with a chain shuttling agent, and the polymer chain experiences different polymerization conditions in the next reactor or polymerization zone. Different polymerization conditions in the respective reactors or zones include the use of different monomers, comonomers, or monomer/comonomer(s) ratio, different polymerization temperatures, pressures or partial pressures of various monomers, different catalysts, differing monomer gradients, or any other difference leading to formation of a distinguishable polymer segment. Thus, at least a portion of the polymer comprises two, three, or more, preferably two or three, differentiated polymer segments arranged intramolecularly.

The composite component may be prepared, e.g., by a process comprising contacting an addition polymerizable monomer or mixture of monomers under addition polymerization conditions with a composition comprising at least one addition polymerization catalyst, a cocatalyst, and a chain shuttling agent. The process is characterized by formation of at least some of the growing polymer chains under differentiated process conditions in two or more reactors operating under steady state polymerization conditions or in two or more zones of a reactor operating under plug flow polymerization conditions.

Suitable processes useful in producing the composite component may be found in, e.g. example, U.S. Pat. Nos. 8,053,529, 8,686,087, and 8,716,400. The polymerization may be carried out as a continuous polymerization, e.g., a continuous-solution polymerization, in which catalyst components, monomers, and optionally solvent, adjuvants, scavengers, and/or polymerization aids are continuously supplied to one or more reactors or zones and polymer product continuously removed therefrom. Within the scope of the terms "continuous" and "continuously," as used in this context, are those processes in which there are intermittent additions of reactants and removal of products at small regular or irregular intervals, so that, over time, the overall process is substantially continuous. Further, a chain shuttling agent(s) may be added at any point during the polymerization including in a first reactor or zone, at the exit or slightly before the exit of the first reactor, between the first reactor or zone and a second or any subsequent reactor or zone, or even solely to the second or any subsequent reactor or zone. Exemplary chain shuttling agents, catalysts, and cocatalysts are those disclosed in, e.g., U.S. Pat. No. 7,951,882 and WO 2011/016991 A2. For example, chain shuttling agents that are dialkyl zinc compounds may be used.

The catalyst may be prepared as a homogeneous composition by addition of the requisite metal complex or multiple complexes to a solvent in which the polymerization will be conducted or in a diluent compatible with the ultimate reaction mixture. The desired cocatalyst or activator and, optionally, the shuttling agent may be combined with the catalyst composition either prior to, simultaneously with, or after combination of the catalyst with the monomers to be polymerized and any additional reaction diluent.

Due to the difference in monomers, temperatures, pressures, or other differences in polymerization conditions between at least two of the reactors or zones connected in series, polymer segments of differing composition such as comonomer content, crystallinity, density, tacticity, regio-regularity, or other chemical or physical difference, within the same molecule are formed in the different reactors or zones. The size of each segment or block is determined by continuous polymer reaction conditions, and preferably is a most probable distribution of polymer sizes. Each reactor in the series can be operated under high pressure, solution, slurry, or gas phase polymerization conditions.

In the following exemplary processes, continuous or substantially continuous polymerization conditions may be employed. In a multiple zone polymerization, all zones operate under the same type of polymerization, such as solution, slurry, or gas phase, but at different process conditions. For a solution polymerization process, it is desirable to employ homogeneous dispersions of the catalyst components in a liquid diluent in which the polymer is soluble under the polymerization conditions employed. A high pressure process may be carried out at temperatures from 100° C. to 400° C. and at pressures above 500 bar (50 MPa). A slurry process may use an inert hydrocarbon diluent and temperatures of from 0° C. up to a temperature just below the temperature at which the resulting polymer becomes substantially soluble in the inert polymerization medium. Exemplary temperatures in a slurry polymerization are from 30° C. and pressures may range from atmospheric (100 kPa) to 500 psi (3.4 MPa).

Without limiting in any way the scope of the embodiments, one means for carrying out such a polymerization process is as follows. In one or more well stirred tank or loop reactors operating under solution polymerization conditions, the monomers to be polymerized are introduced continuously together with any solvent or diluent at one part of the reactor. The reactor contains a relatively homogeneous liquid phase composed substantially of monomers together with any solvent or diluent and dissolved polymer. Exemplary solvents include $C_{4-10}$ hydrocarbons or mixtures thereof, especially alkanes such as hexane or mixtures of alkanes, as well as one or more of the monomers employed in the polymerization. Catalyst along with cocatalyst and optionally chain shuttling agent are continuously or intermittently introduced in the reactor liquid phase or any recycled portion thereof at a minimum of one location.

The reactor temperature and pressure may be controlled by adjusting the solvent/monomer ratio, the catalyst addition rate, as well as by use of cooling or heating coils, jackets or both. The polymerization rate is controlled by the rate of catalyst addition. The content of a given monomer in the polymer product is influenced by the ratio of monomers in the reactor, which is controlled by manipulating the respective feed rates of these components to the reactor. The polymer product molecular weight is controlled, optionally, by controlling other polymerization variables such as the temperature, monomer concentration, or by the previously mentioned chain shuttling agent, or a chain terminating agent such as hydrogen. Connected to the discharge of the reactor, optionally by means of a conduit or other transfer means, is a second reactor, such that the reaction mixture prepared in the first reactor is discharged to the second reactor without substantially termination of polymer growth. Between the first and second reactors, a differential in at least one process condition is established. For example, use in formation of a copolymer of two or more monomers, the difference is the presence or absence of one or more comonomers or a difference in comonomer concentration. Additional reactors, each arranged in a manner similar to the second reactor in the series may be provided as well. Upon exiting the last reactor of the series, the effluent is contacted with a catalyst kill agent such as water, steam or an alcohol or with a coupling agent. The resulting polymer product is recovered by flashing off volatile components of the reaction mixture such as residual monomers or diluent at reduced pressure, and, if necessary, conducting further devolatilization in equipment such as a devolatilizing extruder.

Alternatively, the foregoing polymerization may be carried out in a plug flow reactor with a monomer, catalyst, shuttling agent, temperature or other gradient established between differing zones or regions thereof, optionally accompanied by separated addition of catalysts and/or chain shuttling agent, and operating under adiabatic or non-adiabatic polymerization conditions.

The BC and the CBC may comprise two or more embodiments discussed herein.

C. Additives

The present foam bead may include one or more optional additives. Nonlimiting examples of suitable additives include nucleators (e.g., talc and polytetrafluoroethylene (PTFE)), processing aids, lubricants, stabilizers (antioxidants), foaming aids, surfactants, flow aids, viscosity control agents, coloring agents, copper inhibitors, inorganic fillers (e.g., calcium carbonate ($CaCO_3$), titanium dioxide ($TiO_2$)), ethylene-based polymers, propylene-based polymers, and combinations thereof. In an embodiment, the foam bead contains from 0 wt %, or 0.01 wt % to 0.3 wt %, or 0.5 wt %, or 1 wt %, or 2 wt %, or 3 wt %, or 5 wt % optional additive, based on the total weight of the foam bead.

The optional additive may comprise two or more embodiments discussed herein.

D. Foam Bead

The present foam bead includes at least one of the following components: (A) a block composite; and/or (B) a crystalline block composite. In an embodiment, the foam bead further contains (C) one or more optional additives.

In an embodiment, the foam bead has a diameter from 4 mm, or 5 mm to 6 mm, or 7 mm; and/or a length from 4 mm, or 5 mm to 6 mm, or 7 mm.

The foam bead contains at least one of (A) the block composite and (B) the crystalline block composite. In other words, the foam bead may contain either the (A) the block composite or (B) the crystalline block composite; or the foam bead may contain both the (A) the block composite and (B) the crystalline block composite.

In an embodiment, the foam bead contains a composite component selected from (A) the block composite, (B) the crystalline block composite, and combinations thereof. In an embodiment, the foam bead contains at least 50 wt %, or at least 80 wt %, or at least 90 wt %, or at least 95 wt %, or at least 98 wt %, or at least 99 wt %, or 100 wt % of the composite component, based on the total weight of the foam bead. In an embodiment, the foam bead further contains (C) one or more optional additives. Nonlimiting examples of suitable $\alpha$-olefins for the (A) the BC and/or (B) the CBC include, for example, $C_3$, $C_4$, $C_5$, $C_6$ and $C_8$ $\alpha$-olefins. In an embodiment, the $\alpha$-olefin of (A) the BC and/or (B) the CBC is propylene.

In an embodiment, the weight ratio of the (A) block composite and (B) crystalline block composite in the foam bead is from 0:1.0, or 0.25:1, or 1:1 to 4:1.0, or 1.0:0.

In an embodiment, the foam bead comprises, or consists essentially of, or consists of: (A) from 0 wt %, or 20 wt %, or 30 wt %, or 40 wt %, or 50 wt % to 60 wt %, or 70 wt %, or 80 wt %, or 90 wt %, or 100 wt % block composite; (B) from 0 wt %, or 20 wt %, or 30 wt %, or 40 wt %, or 50 wt % to 60 wt %, or 70 wt %, or 80 wt %, or 90 wt %, or 100 wt % crystalline block composite; and optionally, (C) from 0 wt %, or 0.01 wt % to 0.3 wt %, or 0.5 wt %, or 1 wt %, or 2 wt %, or 3 wt %, or 5 wt % optional additive, based on the total weight of the foam bead, with the proviso that the foam bead contains at least one of (A) the block composite and the (B) crystalline block composite. Nonlimiting examples of suitable $\alpha$-olefins for the (A) the BC and/or (B) the CBC include, for example, $C_3$, $C_4$, $C_5$, $C_6$ and $C_8$ $\alpha$-olefins. In an embodiment, the $\alpha$-olefin of (A) the BC and/or (B) the CBC is propylene.

In an embodiment, the foam bead comprises, or consists essentially of, or consists of: (A) from 20 wt %, or 30 wt %, or 40 wt %, or 50 wt % to 60 wt %, or 70 wt %, or 80 wt %, or 90 wt %, or 100 wt % block composite; (B) from 20 wt %, or 30 wt %, or 40 wt %, or 50 wt % to 60 wt %, or 70 wt %, or 80 wt %, or 90 wt %, or 100 wt % crystalline block composite; and optionally, (C) from 0 wt %, or 0.01 wt % to 0.3 wt %, or 0.5 wt %, or 1 wt %, or 2 wt %, or 3 wt %, or 5 wt % optional additive, based on the total weight of the foam bead. Nonlimiting examples of suitable $\alpha$-olefins for the (A) the BC and/or (B) the CBC include, for example, $C_3$, $C_4$, $C_5$, $C_6$ and $C_8$ $\alpha$-olefins. In an embodiment, the $\alpha$-olefin of (A) the BC and/or (B) the CBC is propylene.

In an embodiment, the foam bead comprises, or consists essentially of, or consists of: (A) from 50 wt % to 60 wt %, or 70 wt %, or 80 wt % block composite; (B) from 20 wt %, or 30 wt %, or 40 wt % to 50 wt % crystalline block composite; and optionally, (C) from 0 wt %, or 0.01 wt % to 0.3 wt %, or 0.5 wt %, or 1 wt %, or 2 wt %, or 3 wt %, or 5 wt % optional additive, based on the total weight of the foam bead. Nonlimiting examples of suitable $\alpha$-olefins for the (A) the BC and/or (B) the CBC include, for example, $C_3$, $C_4$, $C_5$, $C_6$ and $C_8$ $\alpha$-olefins. In an embodiment, the $\alpha$-olefin of (A) the BC and/or (B) the CBC is propylene.

In an embodiment, the foam bead has two melting peaks, including a first melting peak ($Tm1^{FB}$) and a second melting peak ($Tm2^{FB}$). In an embodiment, the difference between $Tm1^{FB}$ and $Tm2^{FB}$ is greater than 20° C., or greater than 40° C., or greater than 50° C., or greater than 60° C.

In an embodiment, the foam bead has a heat of fusion, Hf, from 30 J/g, or 40 J/g, or 45 J/g, or 50 J/g, or 55 J/g to 60 J/g, or 65 J/g, or 70 J/g, or 75 J/g, or 80 J/g. In another embodiment, the foam bead has a heat of fusion, Hf, from 30 J/g to 80 J/g, or from 34 J/g to 80 J/g.

In an embodiment, the foam bead has a foam density of less than 0.20 g/cc. In another embodiment, the foam bead has a foam density from 0.05 g/cc, or 0.09 g/cc, or 0.10 g/cc to 0.11 g/cc, or 0.12 g/cc, or 0.14 g/cc, or 0.15 g/cc, or 0.19 g/cc, or less than 0.20 g/cc. In another embodiment, the foam bead has a density from 0.05 g/cc to less than 0.20 g/cc, or from 0.05 g/cc to 0.11 g/cc. Other features being equal, a lower foam density indicates a polymer or a polymer blend has improved foaming ability.

In an embodiment, the foam bead comprises, or consists essentially of, or consists of: (A) from 0 wt %, or 20 wt %, or 30 wt %, or 40 wt %, or 50 wt % to 60 wt %, or 70 wt %, or 80 wt %, or 90 wt %, or 100 wt % block composite; (B) from 0 wt %, or 20 wt %, or 30 wt %, or 40 wt %, or 50 wt % to 60 wt %, or 70 wt %, or 80 wt %, or 90 wt %, or 100 wt % crystalline block composite; and optionally, (C) from 0 wt %, or 0.01 wt % to 0.3 wt %, or 0.5 wt %, or 1 wt %, or 2 wt %, or 3 wt %, or 5 wt % optional additive, based on the total weight of the foam bead, with the proviso that the foam bead contains at least one of (A) the block composite and the (B) crystalline block composite. In an embodiment, the foam bead is thermoplastic and has one, some, or all of the following properties: (i) exhibits two melting peaks; and/or (ii) a difference between $Tm1^{FB}$ and $Tm2^{FB}$ that is greater than 20° C., or greater than 40° C., or greater than 50° C., or greater than 60° C.; and/or (iii) a heat of fusion, $H_f$, from 30 J/g, or 40 J/g, or 45 J/g, or 50 J/g, or 55 J/g to 60 J/g, or 65 J/g, or 70 J/g, or 75 J/g, or 80 J/g; and/or (iv) a foam density from 0.05 g/cc, or 0.09 g/cc, or 0.10 g/cc to 0.11 g/cc, or 0.12 g/cc, or 0.14 g/cc, or 0.15 g/cc, or 0.19 g/cc, or less than 0.20 g/cc. In a further embodiment, the foam bead has all of the above properties (i)-(iv). Nonlimiting examples of suitable α-olefins for the (A) the BC and/or (B) the CBC include, for example, $C_3$, $C_4$, $C_5$, $C_6$ and $C_8$ α-olefins. In an embodiment, the α-olefin of (A) the BC and/or (B) the CBC is propylene.

In an embodiment, the foam bead comprises, or consists essentially of, or consists of: (A) from 20 wt %, or 30 wt %, or 40 wt %, or 50 wt % to 60 wt %, or 70 wt %, or 80 wt %, or 90 wt %, or 100 wt % block composite; (B) from 20 wt %, or 30 wt %, or 40 wt %, or 50 wt % to 60 wt %, or 70 wt %, or 80 wt %, or 90 wt %, or 100 wt % crystalline block composite; and optionally, (C) from 0 wt %, or 0.01 wt % to 0.3 wt %, or 0.5 wt %, or 1 wt %, or 2 wt %, or 3 wt %, or 5 wt % optional additive, based on the total weight of the foam bead. In an embodiment, the foam bead is thermoplastic and has one, some, or all of the following properties: (i) exhibits two melting peaks; and/or (ii) a difference between $Tm1^{FB}$ and $Tm2^{FB}$ that is greater than 20° C., or greater than 40° C., or greater than 50° C., or greater than 60° C.; and/or (iii) a heat of fusion, Hf, from 30 J/g, or 40 J/g, or 45 J/g, or 50 J/g, or 55 J/g to 60 J/g, or 65 J/g, or 70 J/g, or 75 J/g, or 80 J/g; and/or (iv) a foam density from 0.05 g/cc, or 0.09 g/cc, or 0.10 g/cc to 0.11 g/cc, or 0.12 g/cc, or 0.14 g/cc, or 0.15 g/cc, or 0.19 g/cc, or less than 0.20 g/cc. In a further embodiment, the foam bead has all of the above properties (i)-(iv). Nonlimiting examples of suitable α-olefins for the (A) the BC and/or (B) the CBC include, for example, $C_3$, $C_4$, $C_5$, $C_6$ and $C_8$ α-olefins. In an embodiment, the α-olefin of (A) the BC and/or (B) the CBC is propylene.

It is understood that the sum of the components in each of the foam beads disclosed herein, including the foregoing foam beads, yields 100 weight percent (wt %).

A nonlimiting example of a process for producing foam beads is described in Polymer 56 (2015) 5-19, the entire contents of which are herein incorporated by reference.

In an embodiment, the components (i.e., the (A) the BC and/or (B) the CBC; and (C) optionally, one or more additives) are dry-blended, the blend is extruded, and the extrudate is pelletized. The pellet may have a diameter from 2.0 mm, or 2.3 mm to 3.0 mm, or 3.5 mm and a length from 2.0 mm, or 2.3 mm to 3.0 mm, or 3.5 mm. In an embodiment, the composition is in the form of a pellet with a diameter from 2.3 mm to 3.0 mm and a length from 2.3 mm to 3.0 mm. The pellets are then saturated with a blowing agent to form a foam bead.

A nonlimiting example of a suitable blowing agent is a physical blowing agent. Nonlimiting examples of suitable physical blowing agents include an inert gas such as nitrogen ($N_2$), a carbon gas (e.g., CO, $CO_2$, etc.), helium, and argon; a hydrocarbon such as methane, propane, and butane (e.g., isobutane), pentane; and a halogenated hydrocarbon such as dichlorodifluoromethane, dichloromonofluoromethane, monochlorodifluoromethane, trichloromonofluoromethane, monochloropentafluoroethane, and trichlorotrifluoroethane. In an embodiment, the physical blowing agent is carbon dioxide ($CO_2$). A nonlimiting example of a suitable carbon dioxide is supercritical carbon dioxide. Supercritical carbon dioxide is a fluid state of carbon dioxide that is held at or above its critical temperature (31.10° C.) and critical pressure (7.39 MPa). In an embodiment, the blowing agent is a physical blowing agent to the exclusion of chemical blowing agents. In an embodiment, the pellet is contacted with the physical blowing agent at a temperature of from 90° C., or 95° C., or 100° C., or 110° C., or 115° C. to 117° C., or 120° C., or 125° C., or 130° C., or 135° C.

In an embodiment, the pellet is contacted with the physical blowing agent (e.g., supercritical carbon dioxide) via impregnation of the pellets with the blowing agent in an autoclave. The impregnating occurs at a temperature within ±0° C. to ±40° C. of the second melting point of the BC and/or the CBC (i.e., $Tm2^{BC}$ or $Tm2^{CBC}$). In a further embodiment, the impregnating occurs at a temperature from 90° C., or 95° C., or 100° C., or 110° C., or 115° C. to 117° C., or 120° C., or 125° C., or 130° C., or 135° C. In an embodiment, the impregnating occurs with a physical blowing agent pressure of from 5 MPa, or 8 MPa, or 10 MPa, or 11 MPa to 12 MPa, or 13 MPa, or 15 MPa, or 20 MPa, or 25 MPa, or 30 MPa and a saturation time of from 0.5 hours, or 1.0 hour to 1.5 hours, or 2.0 hours, or 3.0 hours. Following the saturation time, the autoclave is depressed to 25° C. and 0.1 MPa. During depression, the impregnated pellets expand to foam beads.

The instant disclosure provides a sintered foam structure formed from the present foam beads.

E. Sintered Foam Structure

The instant disclosure provides a sintered foam structure. The sintered foam structure includes at least one of the following components: (A) a block composite and/or (B) a crystalline block composite.

A sintered foam structure may comprise a combination of two or more embodiments as described herein.

In an embodiment, the present sintered foam structure further includes (C) one or more optional additives.

The (A) block composite, (B) crystalline block composite, and (C) optional additive may be any respective (A) block composite, (B) crystalline block composite, and (C) optional additive disclosed herein.

The sintered foam structure is an article formed via sintering of foam beads. The foam beads may be any foam bead disclosed herein. A nonlimiting method of sintering includes steam-chest molding. Steam-chest molding occurs at a temperature from 80° C., or 90° C. to 100° C., or 110° C., or 120° C., or 130° C., or 140° C. and/or a pressure from 0.05 MPa, or 0.1 MPa to 0.2 MPa, or 0.4 MPa. In another embodiment, the sintered foam structure is formed as described in Polymer 56 (2015) 5-19, the entire contents of which are herein incorporated by reference.

Figure 2:
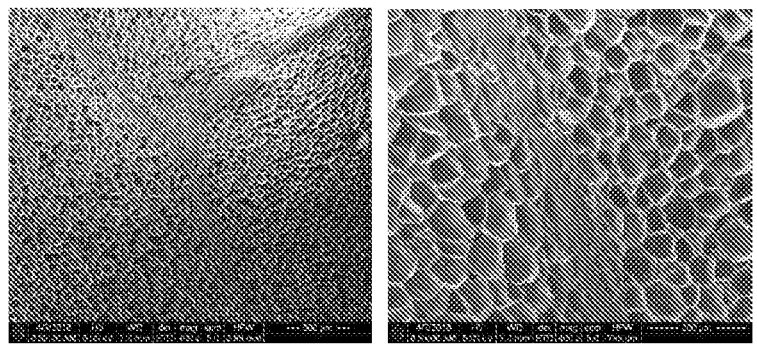
FIG. 2 is a scanning electron microscope (SEM) micrograph of Ex 5 Structure.

In an embodiment, in the sintered foam structure, the skin of each bead is melt fused with the adjacent bead's skin to form a continuous foam, as shown in FIG. 2.

The sintered foam structure contains at least one of (A) the block composite and (B) the crystalline block composite. In other words, the sintered foam structure may contain either the (A) the block composite or (B) the crystalline block composite; or the sintered foam structure may contain both the (A) the block composite and (B) the crystalline block composite.

In an embodiment, the sintered foam structure contains a composite component selected from (A) the block composite, (B) the crystalline block composite, and combinations thereof. In an embodiment, the sintered foam structure contains at least 50 wt %, or at least 80 wt %, or at least 90 wt %, or at least 95 wt %, or at least 98 wt %, or at least 99 wt %, or 100 wt % of the composite component, based on the total weight of the sintered foam structure. In an embodiment, the sintered foam structure further contains (C) one or more optional additives. Nonlimiting examples of suitable α-olefins for the (A) the BC and/or (B) the CBC include, for example, $C_3$, $C_4$, $C_5$, $C_6$ and $C_8$ α-olefins. In an embodiment, the α-olefin of (A) the BC and/or (B) the CBC is propylene.

In an embodiment, the weight ratio of the (A) block composite and (B) crystalline block composite in the sintered foam structure is from 0:1.0, or 0.25:1, or 1:1 to 4:1.0, or 1.0:0.

In an embodiment, the sintered foam structure comprises, or consists essentially of, or consists of: (A) from 0 wt %, or 20 wt %, or 30 wt %, or 40 wt %, or 50 wt % to 60 wt %, or 70 wt %, or 80 wt %, or 90 wt %, or 100 wt % block composite; (B) from 0 wt %, or 20 wt %, or 30 wt %, or 40 wt %, or 50 wt % to 60 wt %, or 70 wt %, or 80 wt %, or 90 wt %, or 100 wt % crystalline block composite; and optionally, (C) from 0 wt %, or 0.01 wt % to 0.3 wt %, or 0.5 wt %, or 1 wt %, or 2 wt %, or 3 wt %, or 5 wt % optional additive, based on the total weight of the sintered foam structure, with the proviso that the sintered foam structure contains at least one of (A) the block composite and the (B) crystalline block composite. Nonlimiting examples of suitable α-olefins for the (A) the BC and/or (B) the CBC include, for example, $C_3$, $C_4$, $C_5$, $C_6$ and $C_8$ α-olefins. In an embodiment, the α-olefin of (A) the BC and/or (B) the CBC is propylene.

In an embodiment, the sintered foam structure comprises, or consists essentially of, or consists of: (A) from 20 wt %, or 30 wt %, or 40 wt %, or 50 wt % to 60 wt %, or 70 wt %, or 80 wt %, or 90 wt %, or 100 wt % block composite; (B) from 20 wt %, or 30 wt %, or 40 wt %, or 50 wt % to 60 wt %, or 70 wt %, or 80 wt %, or 90 wt %, or 100 wt % crystalline block composite; and optionally, (C) from 0 wt %, or 0.01 wt % to 0.3 wt %, or 0.5 wt %, or 1 wt %, or 2 wt %, or 3 wt %, or 5 wt % optional additive, based on the total weight of the sintered foam structure. Nonlimiting examples of suitable α-olefins for the (A) the BC and/or (B) the CBC include, for example, $C_3$, $C_4$, $C_5$, $C_6$ and $C_8$ α-olefins. In an embodiment, the α-olefin of (A) the BC and/or (B) the CBC is propylene.

In an embodiment, the sintered foam structure comprises, or consists essentially of, or consists of: (A) from 50 wt % to 60 wt %, or 70 wt %, or 80 wt % block composite; (B) from 20 wt %, or 30 wt %, or 40 wt % to 50 wt % crystalline block composite; and optionally, (C) from 0 wt %, or 0.01 wt % to 0.3 wt %, or 0.5 wt %, or 1 wt %, or 2 wt %, or 3 wt %, or 5 wt % optional additive, based on the total weight of the sintered foam structure. Nonlimiting examples of suitable α-olefins for the (A) the BC and/or (B) the CBC include, for example, $C_3$, $C_4$, $C_5$, $C_6$ and $C_8$ α-olefins. In an embodiment, the α-olefin of (A) the BC and/or (B) the CBC is propylene.

In an embodiment, the sintered foam structure is thermoplastic.

In an embodiment, the sintered foam structure has an Asker C hardness from 30, or 35, or 40 to 60, or 70.

In an embodiment, the sintered foam structure has a foam density of less than 0.20 g/cc. In another embodiment, the sintered foam structure has a foam density from 0.05 g/cc, or 0.08 g/cc to 0.19 g/cc, or less than 0.20 g/cc. In another embodiment, the sintered foam structure has a density from 0.05 g/cc to less than 0.20 g/cc, or from 0.05 g/cc to 0.19 g/cc.

In an embodiment, the sintered foam structure has a falling ball rebound from 30%, or 35%, or 40% to 50%, or 55%, or 60%, or 65%, or 70%, or 80%.

In an embodiment, the sintered foam structure has an average strain at break from 20%, or 24% to 45%, or 50%.

In an embodiment, the sintered foam structure has an average stress at break equal to, or greater than, 0.50 MPa. In another embodiment, the sintered foam structure has an average stress at break from 0.50 MPa, or 0.55 MPa, or 0.60 MPa, or 0.65 MPa, or 0.70 MPa, or 0.75 MPa to 1.40 MPa, or 1.65 MPa, or 1.70 MPa, or 2.00 MPa.

In an embodiment, the sintered foam structure has a Type C Tear from 4.5 N/mm, or 5.0 N/mm, or 5.5 N/mm, or 6.0 N/mm, or 8 N/mm to 10 N/mm, or 11 N/mm, or 12 N/mm, or 15 N/mm.

In an embodiment, the sintered foam structure has a Split Tear from 1.0 N/mm, or 1.5 N/mm, or 1.75 N/mm to 2.25 N/mm, or 2.5 N/mm.

In an embodiment, the sintered foam structure has a linear shrinkage (70° C./40 minutes) of less than, or equal to 1.0%, or less than, or equal to 0.8%. In another embodiment, the sintered foam structure has a linear shrinkage (70° C./40 minutes) from 0.1%, or 0.3% to 0.5%, or 0.6%, or 0.7%, or 0.8% or 1.0%.

In an embodiment, the sintered foam structure has a compression set (50%, 50° C./6 hours) from 70%, or 75%, or 77% to 88%, or 90%.

In an embodiment, the sintered foam structure has a foam density of less than 0.20 g/cc; and a linear shrinkage of less than, or equal to, 1.0%.

In an embodiment, the sintered foam structure has a compression set less than, or equal to, 90%; and an average stress at break greater than, or equal to, 0.50 MPa.

In an embodiment, the sintered foam structure has two melting peaks, including a first melting peak ($Tm1^{SFS}$) and a second melting peak ($Tm2^{SFS}$). In an embodiment, the difference between $Tm1^{SFS}$ and $Tm2^{SFS}$ is greater than 20° C., or greater than 40° C., or greater than 50° C., or greater than 60° C.

In an embodiment, the sintered foam structure has a Type C Tear from 4.5 N/mm, or 5.0 N/mm, or 5.5 N/mm, or 6.0 N/mm, or 8 N/mm to 10 N/mm, or 11 N/mm, or 12 N/mm, or 15 N/mm; and an average stress at break greater than, or equal to, 0.50 MPa.

In an embodiment, the sintered foam structure comprises, or consists essentially of, or consists of: (A) from 0 wt %, or 20 wt %, or 30 wt %, or 40 wt %, or 50 wt % to 60 wt %, or 70 wt %, or 80 wt %, or 90 wt %, or 100 wt % block composite; (B) from 0 wt %, or 20 wt %, or 30 wt %, or 40 wt %, or 50 wt % to 60 wt %, or 70 wt %, or 80 wt %, or 90 wt %, or 100 wt % crystalline block composite; and optionally, (C) from 0 wt %, or 0.01 wt % to 0.3 wt %, or 0.5 wt %, or 1 wt %, or 2 wt %, or 3 wt %, or 5 wt % optional additive, based on the total weight of the sintered foam structure, with the proviso that the sintered foam structure contains at least one of (A) the block composite and the (B) crystalline block composite. In an embodiment, the sintered foam structure is thermoplastic and has one, some, or all of the following properties: (i) an Asker C hardness from 30, or 35, or 40 to 60, or 70; and/or (ii) a foam density from 0.05 g/cc, or 0.08 g/cc to 0.19 g/cc, or less than 0.20 g/cc; and/or (iii) a falling ball rebound from 30%, or 35%, or 40% to 50%, or 55%, or 60%, or 65%, or 70%, or 80%; and/or (iv) an average strain at break from 20%, or 24% to 45%, or 50%; and/or (v) an average stress at break from 0.50 MPa, or 0.55 MPa, or 0.60 MPa, or 0.65 MPa, or 0.70 MPa, or 0.75 MPa to 1.40 MPa, or 1.65 MPa, or 1.70 MPa, or 2.00 MPa; and/or (vi) a Type C Tear from 4.5 N/mm, or 5.0 N/mm, or 5.5 N/mm, or 6.0 N/mm, or 8 N/mm to 10 N/mm, or 11 N/mm, or 12 N/mm, or 15 N/mm; and/or (vii) a Split Tear from 1.0 N/mm, or 1.5 N/mm, or 1.75 N/mm to 2.25 N/mm, or 2.5 N/mm; and/or (viii) a linear shrinkage (70° C./40 minutes) from 0.1%, or 0.3% to 0.5%, or 0.6%, or 0.7%, or 0.8% or 1.0%; and/or (ix) a compression set (50%, 50° C./hours) from 70%, or 75%, or 77% to 88%, or 90%; and/or (x) exhibits two melting peaks; and/or (xi) the difference between $Tm1^{SFS}$ and $Tm2^{SFS}$ is greater than 20° C., or greater than 40° C., or greater than 50° C., or greater than 60° C. In a further embodiment, the sintered foam structure has all of the above properties (i)-(xi). Nonlimiting examples of suitable α-olefins for the (A) the BC and/or (B) the CBC include, for example, $C_3$, $C_4$, $C_5$, $C_6$ and $C_8$ α-olefins. In an embodiment, the α-olefin of (A) the BC and/or (B) the CBC is propylene.

In an embodiment, the sintered foam structure comprises, or consists essentially of, or consists of: (A) from 20 wt %, or 30 wt %, or 40 wt %, or 50 wt % to 60 wt %, or 70 wt %, or 80 wt %, or 90 wt %, or 100 wt % block composite; (B) from 20 wt %, or 30 wt %, or 40 wt %, or 50 wt % to 60 wt %, or 70 wt %, or 80 wt %, or 90 wt %, or 100 wt % crystalline block composite; and optionally, (C) from 0 wt %, or 0.01 wt % to 0.3 wt %, or 0.5 wt %, or 1 wt %, or 2 wt %, or 3 wt %, or 5 wt % optional additive, based on the total weight of the sintered foam structure. In an embodiment, the sintered foam structure is thermoplastic and has one, some, or all of the following properties: (i) an Asker C hardness from 30, or 35, or 40 to 60, or 70; and/or (ii) a foam density from 0.05 g/cc, or 0.08 g/cc to 0.19 g/cc, or less than 0.20 g/cc; and/or (iii) a falling ball rebound from 30%, or 35%, or 40% to 50%, or 55%, or 60%, or 65%, or 70%, or 80%; and/or (iv) an average strain at break from 20%, or 24% to 45%, or 50%; and/or (v) an average stress at break from 0.50 MPa, or 0.55 MPa, or 0.60 MPa, or 0.65 MPa, or 0.70 MPa, or 0.75 MPa to 1.40 MPa, or 1.65 MPa, or 1.70 MPa, or 2.00 MPa; and/or (vi) a Type C Tear from 4.5 N/mm, or 5.0 N/mm, or 5.5 N/mm, or 6.0 N/mm, or 8 N/mm to 10 N/mm, or 11 N/mm, or 12 N/mm, or 15 N/mm; and/or (vii) a Split Tear from 1.0 N/mm, or 1.5 N/mm, or 1.75 N/mm to 2.25 N/mm, or 2.5 N/mm; and/or (viii) a linear shrinkage (70° C./40 minutes) from 0.1%, or 0.3% to 0.5%, or 0.6%, or 0.7%, or 0.8% or 1.0%; and/or (ix) a compression set (50%, 50° C./hours) from 70%, or 75%, or 77% to 88%, or 90%; and/or (x) exhibits two melting peaks; and/or (xi) the difference between $Tm1^{SFS}$ and $Tm2^{SFS}$ is greater than 20° C., or greater than 40° C., or greater than 50° C., or greater than 60° C. In a further embodiment, the sintered foam structure has all of the above properties (i)-(xi). Nonlimiting examples of suitable α-olefins for the (A) the BC and/or (B) the CBC include, for example, $C_3$, $C_4$, $C_5$, $C_6$ and $C_8$ α-olefins. In an embodiment, the α-olefin of (A) the BC and/or (B) the CBC is propylene.

Nonlimiting examples of suitable sintered foam structures include footwear (e.g., midsoles of footwear), packaging, sporting goods, construction materials, and insulation.

Test Methods

Asker C Hardness of sintered foam structures was measured in accordance with ASTM D2240 on plaques with the dimensions 20 cm (length)×10 cm (width)×1-2 cm (thickness) (original sintered foam structure with two skin layers). One sample was tested for each example. Each sample was measured at least three times (with a 5 second latency between each measurement), across the surface of the sample (i.e., different positions along the sample). The average was recorded.

Average Stress at Break was measured in accordance with ASTM D638. A sintered foam structure in the form of a plaque with the dimensions 20 cm (length)×10 cm (width)× 1-2 cm (thickness) (original sintered foam structure with two skin layers), was die cut into samples following the Type 4 specimen (one side skin on, dogbone, thickness 3-5 mm). The strain at break was measured at a testing speed of 20 inches/minute. The average of three samples was reported. The result was recorded in INSTRON 5565 in terms of percentage.

Compression set was measured in accordance with ASTM D395, Method B, under the conditions of 50% compression at 50° C. for 6 hours. The top skin layer was removed from a sintered foam structure (using a horizontal band saw), in the form of a plaque, with the dimensions 20 cm (length)×10 cm (width)×1-2 cm (thickness). Samples were then die cut from the plaque. Samples were cylinder shaped having a 29 mm diameter and a 19 mm thickness. Two samples were tested for each example, and the average was reported. Compression set was calculated using the following Equation: Compression Set=$(T_1-T_2)/(T_1-T_0)\times 100$; where $T_0$ is the interval distance of the apparatus; $T_1$ is the sample thickness before testing; and $T_2$ is the sample thickness after recovered for 30 mins.

Density of the foam beads was measured by using water displacement method according to ASTM D792. The result was recorded in grams (g) per cubic centimeter (g/cc or g/cm$^3$).

Density of the polymers was measured in accordance with ASTM D792, Method B. The result was recorded in grams (g) per cubic centimeter (g/cc or g/cm$^3$).

The difference between two melting peaks (e.g., between $Tm1^{FB}$ and $Tm2^{FB}$) was calculated as the absolute value of the first melting peak (e.g., $Tm1^{FB}$) minus the second melting peak (e.g., $Tm2^{FB}$).

Foam density of sintered foam structures was measured by weighing a plaque with the dimensions 20 cm (length)×

10 cm (width)×1-2 cm (thickness) (original sintered foam structure with two skin layers), in grams, and determining the volume (in cubic centimeter, cm³) of the plaque using the length, width, and thickness of the plaque. The result (weight/volume) was recorded in g/cm³ (g/cc).

Falling ball rebound was measured by dropping a ⅝ inch (1.59 cm) diameter steel ball from a height of 500 mm onto a sintered foam structure in the form of a plaque with the dimensions 20 cm (length)×10 cm (width)×1-2 cm (thickness) (original sintered foam structure with two skin layers). The distance the ball rebounds off of the top surface of the plaque was measured in millimeters (mm). The falling ball rebound was calculated as a percentage using the following Equation: Falling Ball Rebound=(ball rebound distance× 100)/500.

Linear shrinkage was measured on a vertically cut sample (vertical band saw) from an original sintered foam structure, in the form of a plaque with the dimensions 20 cm (length)× 10 cm (width)×1-2 cm (thickness). Samples were cut using a vertical band saw to a sample size of 75 mm×75 mm×10 mm; each sample contained a top skin layer along the "10 mm" thickness and a bottom skin layer along the "10 mm" thickness. The length ($L_0$) of each sample was measured. Then, the samples were placed into an oven pre-heated to 70° C. The samples were heated in the oven for 40 minutes. After removing the samples from the oven, the samples were cooled for 24 hours at room temperature (23° C.). Then, the length ($L_1$) of each sample was measured. The change in length of the sample, reported as a percentage, is the linear shrinkage ($L_0-L_1$)/($L_0$).

Melt index (I2) was measured at 190° C. under a load of 2.16 kg according to ASTM D1238. The result was recorded in grams eluted per 10 minutes (g/10 min).

Shore A hardness was measured in accordance with ASTM D2240.

Type C Tear was measured in accordance with ASTM D624. A sintered foam structure in the form of a plaque with the dimensions 20 cm (length)×10 cm (width)×1-2 cm (thickness) was cut into samples following the Type C specimen specified in ASTM D624 (one skin on, thickness=3 mm). Type C Tear was measured at a testing speed of 20 inches/minute. The result was recorded in Newtons per millimeter (N/mm). The average of three samples was recorded.

Split Tear was measured in accordance with ASTM D3574 Test F. A sintered foam structure in the form of a plaque with the dimensions 20 cm (length)×10 cm (width)× 1-2 cm (thickness) was cut (vertical band saw) into samples with the following dimensions: 15 cm (length)×12.5 cm (width)×1.0 cm (thickness). Each sample contained a top skin layer along the "1 cm" thickness, and a bottom skin layer along the "1 cm" thickness. Split tear was measured with a notch depth of 2.5-4 cm, through a skin layer, perpendicular to the direction of the thickness) at a testing speed of 50 mm/minute. The result was recorded in Newtons per millimeter (N/mm). The average of three samples was recorded.

Differential Scanning Calorimetry (DSC)

Differential Scanning calorimetry (DSC) can be used to measure the melting, crystallization, and glass transition behavior of a polymer over a wide range of temperature. For example, the TA Instruments Q1000 DSC, equipped with an RCS (refrigerated cooling system) and an autosampler was used to perform this analysis. During testing, a nitrogen purge gas flow of 50 ml/min was used. Each sample was melt pressed into a thin film at 190° C.; the melted sample was then air-cooled to room temperature (25° C.). A 3-10 mg, 6 mm diameter specimen was extracted from the cooled polymer, weighed, placed in a light aluminum pan (50 mg), and crimped shut. Analysis was then performed to determine its thermal properties.

The thermal behavior of the sample was determined by ramping the sample temperature up and down to create a heat flow versus temperature profile. First, the sample was rapidly heated to 180° C. and held isothermal for 3 minutes in order to remove its thermal history. Next, the sample was cooled to −80° C. at a 10° C./minute cooling rate and held isothermal at −80° C. for 3 minutes. The sample was then heated to 180° C. (this is the "second heat" ramp) at a 10° C./minute heating rate. The cooling and second heating curves were recorded. The values determined are extrapolated onset of melting, $T_m$, and extrapolated onset of crystallization, $T_c$. Heat of fusion (Hf) (in Joules per gram), and the calculated % crystallinity for polyethylene samples using the following Equation: % Crystallinity=(($H_f$)/292 J/g)×100.

The heat of fusion ($H_f$) (also known as melt enthalpy) and the peak melting temperature were reported from the second heat curve, unless otherwise indicated.

Melting point, $T_m$, was determined from the DSC heating curve by first drawing the baseline between the start and end of the melting transition. A tangent line was then drawn to the data on the low temperature side of the melting peak. Where this line intersects the baseline is the extrapolated onset of melting ($T_m$). This is as described in Bernhard Wunderlich, *The Basis of Thermal Analysis, in Thermal Characterization of Polymeric Materials* 92, 277-278 (Edith A. Turi ed., 2d ed. 1997). The melting point is the peak temperature.

Glass transition temperature, $T_g$, was determined from the DSC heating curve where half the sample has gained the liquid heat capacity as described in Bernhard Wunderlich, *The Basis of Thermal Analysis, in Thermal Characterization of Polymeric Materials* 92, 278-279 (Edith A. Turi ed., 2d ed. 1997). Baselines were drawn from below and above the glass transition region and extrapolated through the $T_g$ region. The temperature at which the sample heat capacity was half-way between these baselines is the $T_g$.

Gel Permeation Chromatography (3D-GPC) for Molecular Weight

The chromatographic system consisted of a PolymerChar GPC-IR (Valencia, Spain) high temperature GPC chromatograph equipped with an internal IR5 infra-red detector (IR5) coupled to a Precision Detectors (Now Agilent Technologies) 2-angle laser light scattering (LS) detector Model 2040. For all Light scattering measurements, the 15 degree angle is used for measurement purposes. The autosampler oven compartment was set at 160° Celsius and the column compartment was set at 150° Celsius. The columns used were 4 Agilent "Mixed A" 30 cm 20-micron linear mixed-bed columns. The chromatographic solvent used was 1,2,4 trichlorobenzene and contained 200 ppm of butylated hydroxytoluene (BHT). The solvent source was nitrogen sparged. The injection volume used was 200 microliters and the flow rate was 1.0 milliliters/minute.

Calibration of the GPC column set was performed with at least 20 narrow molecular weight distribution polystyrene standards with molecular weights ranging from 580 to 8,400,000 and were arranged in 6 "cocktail" mixtures with at least a decade of separation between individual molecular weights. The standards were purchased from Agilent Technologies. The polystyrene standards were prepared at 0.025 grams in 50 milliliters of solvent for molecular weights equal to or greater than 1,000,000, and 0.05 grams in 50 milliliters of solvent for molecular weights less than 1,000, 000. The polystyrene standards were dissolved at 80° C. with gentle agitation for 30 minutes. The polystyrene standard peak molecular weights were converted to polyethylene molecular weights using EQ1 (as described in Williams and Ward, J. Polym. Sci., Polym. Let., 6, 621 (1968)):

$$M_{polyethylene} = A \times (M_{polystyrene})^B \quad \text{(EQ1)}$$

where M is the molecular weight, A has a value of 0.4315 and B is equal to 1.0.

A fifth order polynomial was used to fit the respective polyethylene-equivalent calibration points. A small adjustment to A (from approximately 0.415 to 0.44) was made to correct for column resolution and band-broadening effects such that NIST standard NBS 1475 is obtained at 52,000 Mw.

Samples were prepared in a semi-automatic manner with the PolymerChar "Instrument Control" Software, wherein the samples were weight-targeted at 2 mg/ml, and the solvent (contained 200 ppm BHT) was added to a pre nitrogen-sparged septa-capped vial, via the PolymerChar high temperature autosampler. The samples were dissolved for 2 hours at 160° Celsius under "low speed" shaking.

The calculations of $Mn_{(GPC)}$, $Mw_{(GPC)}$, and $Mz_{(GPC)}$ were based on GPC results using the internal IR5 detector (measurement channel) of the PolymerChar GPC-IR chromatograph according to Equations 2-4, using PolymerChar GPCOne™ software, the baseline-subtracted IR chromatogram at each equally-spaced data collection point (i), and the polyethylene equivalent molecular weight obtained from the narrow standard calibration curve for the point (i) from EQ 1.

$$Mn_{(GPC)} = \frac{\sum_i IR_i}{\sum_i (IR_i / M_{polyethylene_i})} \quad \text{(EQ 2)}$$

$$Mw_{(GPC)} = \frac{\sum_i (IR_i * M_{polyethylene_i})}{\sum_i IR_i} \quad \text{(EQ 3)}$$

$$Mz_{(GPC)} = \frac{\sum_i (IR_i * M_{polyethylene_i}^2)}{\sum_i (IR_i * M_{polyethylene_i})} \quad \text{(EQ 4)}$$

In order to monitor the deviations over time, a flowrate marker (decane) was introduced into each sample via a micropump controlled with the PolymerChar GPC-IR system. This flowrate marker (FM) was used to linearly correct the pump flowrate ($Flowrate_{(nominal)}$) for each sample by retention volume (RV) alignment of the respective decane peak within the sample ($RV_{(FM\ Sample)}$) to that of the decane peak within the narrow standards calibration ($RV_{(FM\ Calibrated)}$). Processing of the flow marker peak was done via the PolymerChar GPCOne™ Software. Acceptable flowrate correction is such that the effective flowrate should be within +/−2% of the nominal flowrate.

The Systematic Approach for the determination of multi-detector offsets is done in a manner consistent with that published by Balke, Mourey, et. al. (Mourey and Balke, Chromatography Polym. Chpt 12, (1992)) (Balke, Thitiratsakul, Lew, Cheung, Mourey, Chromatography Polym. Chpt 13, (1992)), optimizing triple detector log (MW and IV) results from a broad homopolymer polyethylene standard (Mw/Mn>3) to the narrow standard column calibration results from the narrow standards calibration curve using PolymerChar GPCOne™ Software.

The absolute molecular weight data was obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, NY (1987)) using PolymerChar GPCOne™ software. The overall injected concentration, used in the determination of the molecular weight, was obtained from the mass detector area and the mass detector constant, derived from a suitable linear polyethylene homopolymer, or one of the polyethylene standards of known weight-average molecular weight. The calculated molecular weights (using GPCOne™) were obtained using a light scattering constant, derived from one or more of the polyethylene standards mentioned below, and a refractive index concentration coefficient, dn/dc, of 0.104. Generally, the mass detector response (IR5) and the light scattering constant (determined using GPCOne™) should be determined from a linear standard with a molecular weight in excess of about 50,000 g/mole. The viscometer calibration (determined using GPCOne™) can be accomplished using the methods described by the manufacturer, or, alternatively, by using the published values of suitable linear standards, such as Standard Reference Materials (SRM) 1475a (available from National Institute of Standards and Technology (NIST)). A viscometer constant (obtained using GPCOne™) is calculated which relates specific viscosity area (DV) and injected mass for the calibration standard to its intrinsic viscosity. The chromatographic concentrations are assumed low enough to eliminate addressing 2nd viral coefficient effects (concentration effects on molecular weight).

Other respective moments, $Mn_{(Abs)}$ and $Mz_{(Abs)}$ are be calculated according to EQ 5- to EQ7 as follows:

$$Mn_{(Abs)} = \frac{\sum_i IR_i}{\sum_i (IR_i / M_{Absolute_i})} \quad \text{(EQ 5)}$$

$$Mz_{(Abs)} = \frac{\sum_i (IR_i * M_{Absolute_i}^2)}{\sum_i (IR_i * M_{Absolute_i})} \quad \text{(EQ 6)}$$

High Temperature Liquid Chromatography (HTLC)

High Temperature Liquid Chromatography (HTLC) Experimental Method Instrumentation was performed according to the published method of D. Lee et al., J. Chromatogr. A 2011, 1218, 7173, with minor modifications. Two Shimadzu (Columbia, MD, USA) LC-20AD pumps were used to deliver decane and trichlorobenzene (TCB), respectively. Each pump was connected to a 10:1 fixed flow splitter (Part #: 620-P020-HS, Analytical Scientific Instruments Inc., CA, USA). The splitter had a pressure drop of 1500 psi (10.34 MPa) at 0.1 mL/min in $H_2O$ according to the manufacturer. The flow rate of both pumps was set at 0.115 mL/min. After the splitting, the minor flow was 0.01 mL/min for both decane and TCB, determined by weighing the collected solvents for more than 30 min. The volume of the collected eluent was determined by the mass and the densities of the solvents at room temperature. The minor flow was delivered to the HTLC column for separation. The main flow was sent back to the solvent reservoir. A 50-µL mixer (Shimadzu) was connected after the splitters to mix the solvents from the Shimadzu pumps. The mixed solvents were then delivered to the injector in the oven of Waters (Milford, MA, USA) GPCV2000. A Hypercarb™ column (2.1×100 mm, 5 µm particle size) was connected between the injector and a 10-port VICI valve (Houston, TX, USA). The valve was equipped with two 60-µL sample loops. The valve was used to continuously sample eluent from the first dimension (D1) HTLC column to the second dimension (D2) SEC column. The pump of Waters GPCV2000 and a PLgel Rapid™-M column (10×100 mm, 5 µm particle size) were connected to the VICI valve for D2 size exclusion chromatography (SEC). The symmetric configuration was used for the connections as described in the literature (Y. Brun & P. Foster, *J. Sep. Sci.* 2010, 33, 3501). A dual-angle light scattering detector (PD2040, Agilent, Santa Clara, CA, USA) and an IR5 inferred absorbance detector were connected after the SEC column for measurement of concentration, composition, and molecular weight.

Separation for HTLC: Approximately 30 mg were dissolved in 8-mL decane by gently shaking the vial at 160° C. for 2 hours. The decane contained 400 ppm BHT(2,6-Di-tert-butyl-4-methylphenol) as the radical scavenger. The sample vial was then transferred to the autosampler of GPCV2000 for injection. The temperatures of the autosampler, the injector, both the Hypercarb and the PLgel columns, the 10-port VICI valve, and both the LS and IR5 detectors were maintained at 140° C. throughout the separation.

The initial conditions before injection were as follows: flow rate for the HTLC column was 0.01 mL/min; solvent composition in the D1 Hypercarb column was 100% decane; flow rate for the SEC column was 2.51 mL/min at room temperature; solvent composition in the D2 PLgel column was 100% TCB; solvent composition in the D2 SEC column did not change throughout the separation. A 311-µL aliquot of sample solution was injected into the HTLC column. The injection triggered the gradient described below:

from 0-10 min, 100% decane/0% TCB;
from 10-651 min, TCB was increased linearly from 0% TCB to 80% TCB.

The injection also triggered the collection of the light scattering signal at 15° angle (LS15) and the "measure" and "methyl" signals from IR5 detector ($IR_{measure}$ and $IR_{methyl}$) using EZChrom™ chromatography data system (Agilent). The analog signals from detectors were converted to digital signals through a SS420X analog-to-digital converter. The collection frequency was 10 Hz. The injection also triggered the switch of the 10-port VICI valve. The switch of the valve was controlled by the relay signals from the SS420X converter. The valve was switched every 3 min. The chromatograms were collected from 0 to 651 min. Each chromatogram consisted of 651/3=217 SEC chromatograms. After the gradient separation, 0.2 mL of TCB and 0.3 mL of decane were used to clean and re-equilibrate the HTLC column for next separation. The flow rate of this step was 0.2 mL/min, delivered by a Shimadzu LC-20 AB pump connected to the mixer.

Data Analysis for HTLC: The 651 min raw chromatogram was first unfolded to give 217 SEC chromatograms. Each chromatogram was from 0 to 7.53 mL in the unit of 2D elution volume. The integration limit was then set and the SEC chromatograms undergo spike removal, baseline correction, and smoothing. The process was similar to batch analysis of multiple SEC chromatograms in conventional SEC. The sum of all the SEC chromatograms was inspected to ensure both left side (upper integration limit) and right side (lower integration limit) of the peak were at the baseline as zero. Otherwise, the integration limit was adjusted to repeat the process.

Each SEC chromatogram n from 1 to 217 yielded an X-Y pair in the HTLC chromatogram, where n is the fraction number:

$X_n$=elution volume (mL)=D1 flow rate×n×$t_{switch}$ where $t_{switch}$=3 min is the switch time of the 10-port VICI valve $$Y_n = \text{signal intensity (Voltage)} = \sum_{peak\,start}^{peak\,end} IR_{measure,n}.$$

The above equation uses $IR_{measure}$ signal as the example. The obtained HTLC chromatogram showed the concentrations of the separated polymeric components as a function of elution volume. X-Y pairs of data were also obtained from $IR_{methyl}$ and LS15 signals. The ratio of $IR_{methyl}/IR_{measure}$ was used to calculate composition after calibration. The ratio of $LS15/IR_{measure}$ was used to calculate weight-average molecular weight ($M_w$) after calibration.

Calibration followed the procedures of Lee et al. HDPE, isotactic polypropylene (iPP), and ethylene/propylene copolymer with propylene contents of 20.0, 28.0, 50.0, 86.6, 92.0, and 95.8 wt % P were used as the standards for $IR_{methyl}/IR_{measure}$ calibration. The composition of the standards were determined by NMR. The standards were run by SEC with IR5 detector. The obtained $IR_{methyl}/IR_{measure}$ ratios of the standards were plotted as a function of their compositions, yielding the calibration curve.

The HDPE reference was used for routine LS15 calibration. The $M_w$ of the reference was predetermined by GPC as 104.2 kg/mol with LS and RI (refractive index) detectors. GPC used NBS 1475 as the standard in GPC. The standard had a certified value of 52.0 kg/mol by NIST. Between 7 to 10 mg of the standard was dissolved in 8-mL decane at 160° C. The solution was injected to the HTLC column in 100% TCB. The polymer was eluted under constant 100% TCB at 0.01 mL/min. Therefore, the peak of the polymer appeared at the HTLC column void volume. A calibration constant, $\Omega$, ws determined from the total LS15 signals ($A_{LS15}$) and the total $IR_{measure}$ signals ($A_{IR,measure}$):

$$\Omega = \frac{A_{LS15}}{A_{IR,measure}M_w}.$$

The experimental $LS15/IR_{measure}$ ratio was then converted to $M_w$ through $\Omega$.

$^{13}$C Nuclear Magnetic Resonance (NMR)

Sample Preparation: samples were prepared by adding approximately 2.6 g of a 50/50 mixture of tetrachloroethane-d2/orthodichlorobenzene that was 0.025M in chromium acetylacetonate (relaxation agent) to 0.21 g sample in a 10 mm NMR tube. The samples were dissolved and homogenized by heating the tube and its contents to 135-140° C.

Data Acquisition Parameters: data was collected using a Bruker 400 MHz spectrometer equipped with a Bruker Dual DUL high-temperature CryoProbe. The data was acquired using 320 transients per data file, a 7.3 sec pulse repetition delay (6 sec delay+1.3 sec acq. time), 90 degree flip angles, and inverse gated decoupling with a sample temperature of 120° C. All measurements were made on non-spinning samples in locked mode. Samples were homogenized immediately prior to insertion into the heated (125° C.) NMR Sample changer, and were allowed to thermally equilibrate in the probe for 7 minutes prior to data acquisition. The acquisitions were carried out using spectral width of 25,000 Hz and a file size of 65K data points. The NMR is used to determine total weight percent of ethylene of whole polymer, the weight percent of ethylene in xylene soluble fraction, e.g., with respect to the crystalline block composite index or block composite index discussed below.

Xylene Soluble (XS) Fractionation Analysis (ASTM D5492-17)

A weighed amount of resin (2.0000±0.1000, g) was dissolved in 200 ml o-xylene under reflux conditions. The solution was then cooled in a temperature controlled water bath to 25° C. for 60 minutes to allow the crystallization of the xylene insoluble (XI) fraction. Once the solution was cooled and the insoluble fraction precipitates from the solution, the separation of the xylene soluble (XS) fraction from the xylene insoluble fraction (XI) was done by filtration through a filter paper. The remaining o-xylene in xylene solution was evaporated from the filtrate, dried according ASTM D5492-17. The ethylene content in the dried xylene soluble fraction (wt % C2 in xylene soluble) was measured by using $^{13}C$ NMR method specified herein.

Amorphous peak measured by improved comonomer content distribution analysis (iCCD)

The improved method for comonomer content analysis (iCCD) was developed in 2015 (Cong and Parrott et al., WO2017040127A1). The iCCD test was performed with Crystallization Elution Fractionation instrumentation (CEF) (PolymerChar, Spain) equipped with IR-5 detector (PolymerChar, Spain) and two angle light scattering detector Model 2040 (Precision Detectors, currently Agilent Technologies). A guard column packed with 20-27 micron glass (MoSCi Corporation, USA) in a 10 cm (length)×¼" (ID) stainless was installed just before IR-5 detector in the detector oven. Ortho-dichlorobenzene (ODCB, 99% anhydrous grade or technical grade) was used. Silica gel 40 (particle size 0.2~0.5 mm, catalogue number 10181-3) from EMD Chemicals was obtained (can be used to dry ODCB solvent before). The CEF instrument is equipped with an autosampler with N2 purging capability. ODCB is sparged with dried nitrogen ($N_2$) for one hour before use. Sample preparation was done with autosampler at 4 mg/ml (unless otherwise specified) under shaking at 160° C. for 1 hour. The injection volume was 3000 The temperature profile of iCCD was: crystallization at 3° C./min from 105° C. to 30° C., the thermal equilibrium at 30° C. for 2 minute (including Soluble Fraction Elution Time being set as 2 minutes), elution at 3° C./min from 30° C. to 140° C. The flow rate during crystallization is 0.0 ml/min. The flow rate during elution is 0.50 ml/min. The data was collected at one data point/second.

The iCCD column was packed with gold coated nickel particles (Bright 7GNM8-NiS, Nippon Chemical Industrial Co.) in a 15 cm (length)×¼" (ID) stainless tubing. The column packing and conditioning were with a slurry method according to the reference (Cong, R.; Parrott, A.; Hollis, C.; Cheatham, M. WO2017040127A1). The final pressure with TCB slurry packing was 150 Bars.

Column temperature calibration was performed by using a mixture of the Reference Material Linear homopolymer polyethylene (having zero comonomer content, Melt index (12) of 1.0, polydispersity $M_w/M_n$ approximately 2.6 by gel permeation chromatography, 1.0 mg/ml) and Eicosane (2 mg/ml) in ODCB. iCCD temperature calibration consisted of four steps: (1) Calculating the delay volume defined as the temperature offset between the measured peak elution temperature of Eicosane minus 30.00° C.; (2) Subtracting the temperature offset of the elution temperature from iCCD raw temperature data. It is noted that this temperature offset is a function of experimental conditions, such as elution temperature, elution flow rate, etc.; (3) Creating a linear calibration line transforming the elution temperature across a range of 30.00° C. and 140.00° C. so that the linear homopolymer polyethylene reference had a peak temperature at 101.0° C., and Eicosane had a peak temperature of 30.0° C.; (4) For the soluble fraction measured isothermally at 30° C., the elution temperature below 30.0° C. is extrapolated linearly by using the elution heating rate of 3° C./min according to the reference (Cerk and Cong et al., U.S. Pat. No. 9,688,795).

Figure 4:
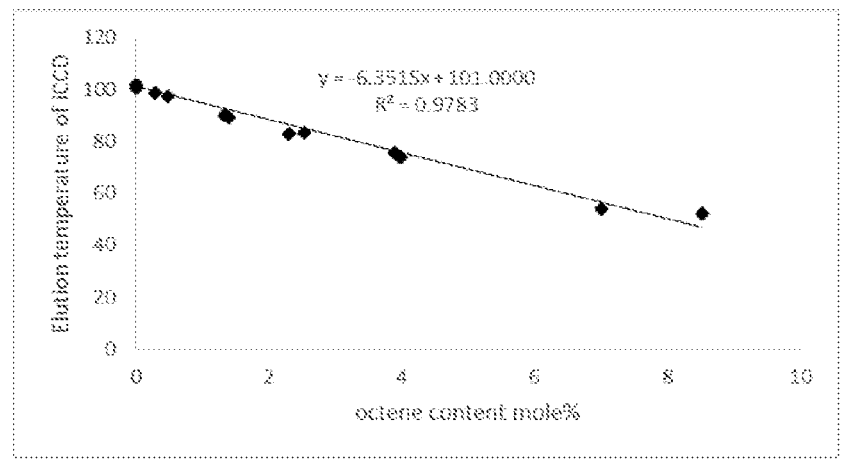
FIG. 4 is a graph showing the correlation between octene content versus elution temperature of improved comonomer content distribution analysis (iCCD) for random ethylene octene copolymers made by single site catalyst.

The comonomer content versus elution temperature of iCCD was constructed by using 12 reference materials (ethylene homopolymer and ethylene-octene random copolymer made with single site metallocene catalyst, having ethylene equivalent weight average molecular weight ranging from 35,000 to 128,000). All of these reference materials were analyzed same way as specified previously at 4 mg/mL. The reported elution peak temperatures followed the FIG. 4 of octene mole % versus elution temperature of iCCD at $R^2$ of 0.978.

Figure 5:
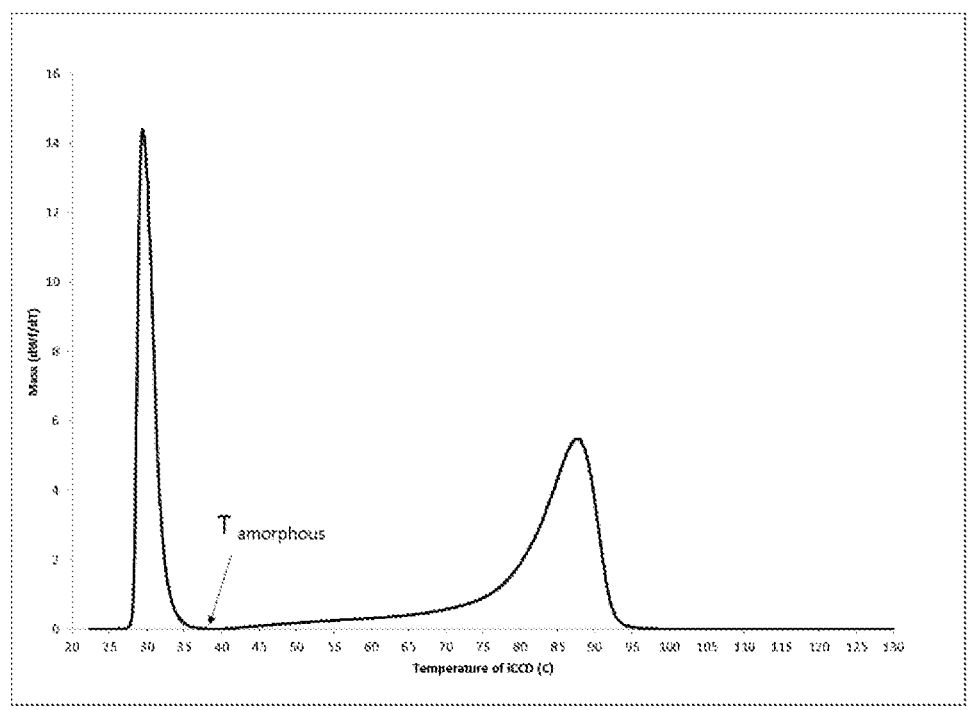
FIG. 5 is an iCCD chromatogram of BC 2.

The calculation of the weight fraction of amorphous component includes the following steps:

(1) Obtain the chromatogram by iCCD, which displays the "$dW_f/dT$ versus elution temperature," where $dW_f/dT$ is the weight fraction ($W_f$) of the polymer eluting at temperature of T;

(2) Determine the elution temperature valley for amorphous component, $T_{amorphous}$, where $T_{amorphous}$ is defined as the elution temperature at which the peak of amorphous component returns to the baseline or nearly to baseline. From iCCD chromatogram, $T_{amorphous}$ is the elution temperature at the peak valley between the low integration limit and 40° C. (for example, see FIG. 5);

(3) Calculate the peak area (%) of amorphous peak;

(4) Calculate weight fraction of amorphous peak ($w_{soluble}$) as following $$w_{soluble} = \frac{\int_{lower\ intergration\ limit}^{T_{amorphous}} dW_f/dT * dT}{\int_{lower\ interation\ limit}^{upper\ intergration\ limit} dW_f/dT * dT}$$

The amorphous material is defined as the material eluting ≤38.5° C. divided the total material elution in the entire integration limits observed by concentration detector.

Some embodiments of the present disclosure will now be described in detail in the following Examples.

EXAMPLES

Representative Polymerization

Sample composite component BC2 was prepared with the reaction conditions of Table 1. The catalyst was ([[rel-2', 2'''-[(1R,2R)-1,2-cylcohexanediylbis(methyleneoxy-κO)] bis[3-(9H-carbazol-9-yl)-5-methyl[1,1'-biphenyl]-2-olato-κO]](2-)]dimethyl-hafnium). Cocatalyst-1 was a mixture of methyldi(C14-18 alkyl)ammonium salts of tetrakis(pentafluorophenyl)borate, prepared by reaction of a long chain trialkylamine (Armeen™ M2HT, available from Akzo Nobel, Inc.), HCl and Li[B(C6F5)4], substantially as disclosed in U.S. Pat. No. 5,919,983, Ex. 2., which were purchased from Boulder Scientific and used without further purification. Cocatalyst-2 was modified methylalumoxane (MMAO), which was purchased from Akzo Nobel and used without further purification. "DEZ" refers to chain shuttling agent diethylzinc.

TABLE 1

| Material | BC 2 | |
|---|---|---|
| Reactor* | 1st Reactor | 2nd Reactor |
| Reactor Control Temp (° C.) | 104.99 | 116.70 |
| Solvent Feed (lb/hr) | 228.57 | 170.52 |
| Propylene Feed (lb/hr) | 7.49 | 23.17 |
| Ethylene Feed (lb/hr) | 14.01 | 0.50 |
| Hydrogen Feed (SCCM) | 0.00 | 0.00 |
| Reactor Ethylene Conc. (g/L) | 1.52 | 0.00 |
| Reactor Propylene Conc. (g/L) | 2.46 | 6.38 |
| Catalyst Efficiency (gPoly/gM) *1.0E6 | 2.55 | 0.70 |
| Catalyst Flow (lb/hr) | 0.20 | 0.75 |
| Catalyst Conc. (ppm) | 39.92 | 39.92 |
| Cocatalyst-1 Flow (lb/hr) | 0.22 | 0.40 |
| Cocatalyst-1 Conc. (ppm) | 499.98 | 999.97 |
| Cocat.-2 Flow (lb/hr) | 0.30 | 0.19 |
| Cocat.-2 Conc. (ppm) | 498.03 | 244.13 |
| DEZ Flow (lb/hr) | 0.22 | 0.00 |
| DEZ Conc. (ppm) | 20000.00 | 0.00 |

*2 reactors in series, a loop followed by CSTR

The measured properties of BC 1, BC 2, and CBC 3 are provided in Table 2 and Table 3.

TABLE 2

| | MFR (230° C./2.16 kg) (g/10 min) | MFR (230° C./10 kg) (g/10 mm) | wt % PP from HTLC Separation | Mw (kg/mol) | Mw/Mn | Total wt % C2 (NMR) | Tm (° C.) Peak 1/ Peak 2 | Tc (° C.) | Melt Enthalpy (J/g) |
|---|---|---|---|---|---|---|---|---|---|
| BC 1 | 6.5 | N/M | 25.3 | 124 | 2.34 | 31.7 | 43/136 | 91 | 44 |
| BC 2 | N/M | 3.6 | 30.7 | 356 | 2.71 | 34.6 | 26/127 | 92 | 40 |
| CBC 3 | 9.5 | N/M | 19.9 | 104 | 2.73 | 47.6 | 108/130 | 88 | 95 |

TABLE 3

| | wt % EP | wt % iPP | wt % $C_2$ in EP | wt % $C_2$ in iPP |
|---|---|---|---|---|
| BC 1 | 50 | 50 | 65 | 0.5 |
| BC 2 | 50 | 50 | 65 | 1.0 |
| CBC 3 | 50 | 50 | 92 | 0.5 |

A. Crystalline Block Composite Index (CBCI) Calculations

CBCI provides an estimate of the quantity of block copolymer within the CBC under the assumption that the ratio of CEB to CAOB within the diblock is the same as the ratio of ethylene to α-olefin in the overall CBC. This assumption is valid for these statistical olefin block copolymers based on the understanding of the individual catalyst kinetics and the polymerization mechanism for the formation of the diblocks via chain shuttling catalysis as described in the specification. This CBCI analysis shows that the amount of isolated PP is less than if the polymer were a simple blend of a propylene homopolymer (in these examples, the CAOP) and polyethylene (in these examples, the CEP). Consequently, the polyethylene fraction contains an appreciable amount of propylene that would not otherwise be present if the polymer were simply a blend of polypropylene and polyethylene. To account for this "extra propylene," a mass balance calculation can be performed to estimate the CBCI from the amount of the polypropylene and polyethylene fractions and the wt % propylene present in each of the fractions that are separated by HTLC. The corresponding CBCI calculations for CBC 3 are provided in Table 4.

TABLE 4

| Line | Variable | Source | CBC 3 |
|---|---|---|---|
| 1 | Overall wt % C3 Total | Measured | 52.400 |
| 2 | wt % C3 in PP block/polymer | Measured | 99.000 |
| 3 | wt % C3 in PE block/polymer | Measured | 10.500 |
| 4 | wt fraction PP (in block or polymer) | Eq. 2 below | 0.500 |
| 5 | wt fraction PE (in block or polymer) | 1-Line 4 | 0.500 |
| | Analysis of HTLC Separation | | |
| 6 | wt fraction isolated PP | Measured | 0.199 |
| 7 | wt fraction PE fraction | Measured | 0.801 |
| 8 | wt % C3 in PE-fraction | Eq. 4 below | 40.823 |
| 9 | wt fraction PP-diblock in PE fraction | Eq. 6 below | 0.343 |
| 10 | wt fraction PE in PE fraction | 1-Line 10 | 0.657 |
| 11 | wt fraction diblock in PE fraction | 10/Line 4 | 0.685 |
| 12 | CBCI | Eq. 7 below | 0.549 |

Referring to Tables 3 and 4, above, the CBCI is measured by first determining a summation of the weight percent propylene from each component in the polymer according to Equation 1, below, which results in the overall wt % propylene/$C_3$ (of the whole polymer). This mass balance equation can be used to quantify the amount of the PP and PE present in the block copolymer. This mass balance equation can also be used to quantify the amount of PP and PE in a binary blend or extended to a ternary, or n-component blend. For CBC 3, the overall amount of PP or PE was contained within the blocks present in the block copolymer and the unbound PP and PE polymers.

$$\text{wt \% } C_3\text{ }_{overall} = w_{PP}(\text{wt \% } C_3\text{ }_{PP}) + w_{PE}(\text{wt \% } C_3\text{ }_{PE}) \quad \text{Equation 1}$$

where $w_{PP}$ is the weight fraction of PP in the polymer; $w_{PE}$ is the weight fraction of PE in the polymer; wt % $C_3$ $_{PP}$ is the weight percent of propylene in the PP component or block; and wt % $C_3$ $_{PE}$ is the weight percent of propylene in the PE component or block.

Note that the overall weight percent of propylene ($C_3$) is measured from $C^{13}$ NMR or some other composition measurement that represents the total amount of $C_3$ present in the whole polymer. The weight percent propylene in the PP block (wt % $C_3$ $_{PP}$) is set to 100 (if applicable) or if otherwise known from its DSC melting point, NMR measurement, or other composition estimate, that value can be put into its place. Similarly, the weight percent propylene in the PE block (wt % $C_3$ $_{PE}$) is set to 100 (if applicable) or if otherwise known from its DSC melting point, NMR measurement, or other composition estimate, that value can be put into its place. The weight percent of $C_3$ is shown in Table 4.

Based on Equation 1, the overall weight fraction of PP present in the polymer can be calculated using Equation 2 from the mass balance of the total $C_3$ measured in the polymer. Alternatively, it could also be estimated from a mass balance of the monomer and comonomer consumption during the polymerization. Overall, this represents the amount of PP and PE present in the polymer regardless of whether it is present in the unbound components or in the block copolymer. For a conventional blend, the weight fraction of PP and weight fraction of PE corresponds to the individual amount of PP and PE polymer present. For the CBC, it is assumed that the ratio of the weight fraction of PP to PE also corresponds to the average block ratio between PP and PE present in this statistical block copolymer.

$$w_{PP} = \frac{\text{wt \%} \, C_{3\,overall} - \text{wt \%} \, C_{3\,PE}}{\text{wt \%} \, C_{3PP} - \text{wt \%} \, C_{3\,PE}} \quad \text{Equation 2}$$

where $w_{PP}$ is the weight fraction of PP in the polymer; wt % $C_{3\,PP}$ is the weight percent of propylene in the PP component or block; and wt % $C_{3\,PE}$ is the weight percent of propylene in the PE component or block.

To estimate the amount of the block copolymer (diblock) in the CBC, Equations 3 through 5 are applied, and the amount of the isolated PP that is measured by HTLC analysis is used to determine the amount of polypropylene present in the diblock copolymer. The amount isolated or separated first in the HTLC analysis represents the 'unbound PP' and its composition is representative of the PP block present in the diblock copolymer. By substituting the overall weight percent $C_3$ of the whole polymer in the left hand side of Equation 3, and the weight fraction of PP (isolated from HTLC) and the weight fraction of PE (separated by HTLC) into the right hand side of Equation 3, the weight percent of $C_3$ in the PE fraction can be calculated using Equations 4 and 5. The PE fraction is described as the fraction separated from the unbound PP and contains the diblock and unbound PE. The composition of the isolated PP is assumed to be the same as the weight percent propylene in the PP block as described previously.

$$\text{wt \%} \, C_{3\,overall} = \quad \text{Equation 3}$$

$$w_{PP\,isolated}(\text{wt \%} \, C_{3PP}) + w_{PE-fraction}(\text{wt \%} \, C_{3\,PE-fraction})$$

$$\text{wt \%} \, C_{3\,PE-fraction} = \frac{\text{wt \%} \, C_{3\,overall} - w_{PP\,isolated}(\text{wt \%} \, C_{3\,PP})}{w_{PE-fraction}} \quad \text{Equation 4}$$

$$w_{PE\,fraction} = 1 - w_{PP\,isolated} \quad \text{Equation 5}$$

where $w_{PP}$ isolated is the weight fraction of isolated PP from HTLC; $w_{PE-fraction}$ is the weight fraction of PE separated from HTLC, containing the diblock and unbound PE; wt % $C_{3\,PP}$ is the wt % of propylene in the PP; which is also the same amount of propylene present in the PP block and in the unbound PP; wt % $C_{3\,PE-fraction}$ is the wt % of propylene in the PE-fraction that was separated by HTLC; and wt % $C_{3\,overall}$ is the overall wt % propylene in the whole polymer.

The amount of wt % $C_3$ in the polyethylene fraction from HTLC represents the amount of propylene present in the block copolymer fraction that is above the amount present in the 'unbound polyethylene.' To account for the 'additional' propylene present in the polyethylene fraction, the only way to have PP present in this fraction, is that the PP polymer chain must be connected to a PE polymer chain (or else it would have been isolated with the PP fraction separated by HTLC). Thus, the PP block remains adsorbed with the PE block until the PE fraction is separated.

The amount of PP present in the diblock is calculated using Equation 6.

$$w_{PP-diblock} = \frac{\text{wt \%} \, C_{3\,PE-fraction} - \text{wt \%} \, C_{3\,PE}}{\text{wt \%} \, C_{3\,PP} - \text{wt \%} \, C_{3\,PE}} \quad \text{Equation 6}$$

where wt % $C_{3\,PE-fraction}$ is the wt % of propylene in the PE-fraction that was separated by HTLC (Equation 4); wt % $C_{3\,PP}$ is the wt % of propylene in the PP component or block (defined previously); wt % $C_{3\,PE}$ is the wt % of propylene in the PE component or block (defined previously); and $w_{PP-diblock}$ is the weight fraction of PP in the diblock separated with PE-fraction by HTLC.

The amount of the diblock present in this PE fraction can be estimated by assuming that the ratio of the PP block to PE block is the same as the overall ratio of PP to PE present in the whole polymer. For example, if the overall ratio of PP to PE is 1:1 in the whole polymer, then it assumed that the ratio of PP to PE in the diblock is also 1:1. Thus, the weight fraction of diblock present in the PE fraction would be weight fraction of PP in the diblock ($w_{PP-diblock}$) multiplied by two. Another way to calculate this is by dividing the weight fraction of PP in the diblock ($w_{PP-diblock}$) by the weight fraction of PP in the whole polymer (Equation 2).

To further estimate the amount of diblock present in the whole polymer, the estimated amount of diblock in the PE fraction is multiplied by the weight fraction of the PE fraction measured from HTLC. To estimate the crystalline block composite index, the amount of diblock copolymer is determined by Equation 7. To estimate the CBCI, the weight fraction of diblock in the PE fraction calculated using Equation 6 is divided by the overall weight fraction of PP (as calculated in Equation 2) and then multiplied by the weight fraction of the PE fraction.

$$CBCI = \frac{w_{PP-diblock}}{w_{PP}} \times w_{PE-fraction} \quad \text{Equation 7}$$

where $w_{PP-diblock}$ is the weight fraction of PP in the diblock separated with the PE-fraction by HTLC (Equation 6); $w_{PP}$ is the weight fraction of PP in the polymer; and $W_{PE-fraction}$ is the weight fraction of PE separated from HTLC, containing the diblock and unbound PE (Equation 5).

B. Block Composite Index (BCI) Calculations

The term Block Composite Index (BCI) is herein defined as the weight percentage of the block copolymer divided by 100% (i.e., weight fraction). The value of the BCI can range from 0 up to 1.0, where 1.0 would be equal to 100% of the block copolymer and zero would be for material such as a traditional blend or random copolymer. Said in another way, for an xylene insoluble fraction, the BCI is 1.0, and for a xylene soluble fraction, the BCI is assigned a value of zero.

The detailed steps for calculation are:
1. Measure the ethylene content of the whole polymer by $^{13}$C NMR (Overall wt % $C_{2\,Total}$)
2. Calculate the ethylene content in PP block (wt % C2 in PP block/polymer, also named as wt % $C_{2\,iPP\,hard}$) from monomer and comonomer feed rates during polymerization process. Alternatively, it can be calculated from DSC melting temperature by using a correlation between Tm of DSC and ethylene content in random propylene ethylene copolymers.
3. Calculate the ethylene content in EP block/polymer (wt % C2 in EP block/polymer, or wt % $C_{2\,EP\,soft}$) from monomer and comonomer feed rates during polymerization process. Alternatively, it can be also calculated from DSC melting temperature by using a correlation between Tm of DSC and ethylene content in a random propylene ethylene copolymers.

4. Calculate the ethylene content in xylene insoluble fraction (wt % $C_{2\ xylene\ insoluble}$, or wt % $C_{2\ insoluble}$) from the equation 8, where $w_{soluble}$ is the weight fraction of amorphous peak measured by iCCD method, $w_{insoluble}$ is the weight fraction of the insoluble peak which is equal to $(1-w_{soluble})$; Weight % ethylene content in xylene soluble fraction (wt % $C_{2\ soluble}$) is measured from $^{13}C$ NMR on xylene soluble fraction.

$$\text{wt \% } C_{2\ overall} = w_{insoluble}(\text{wt \% } C_{2\ insoluble}) + w_{soluble}(\text{wt \% } C_{2\ soluble}) \quad \text{Equation 8}$$

5. Overall $C_2$ content of the whole material follows the Equation 9.

$$\text{wt \% } C_{2\ overall} = w_{iPPhard}(\text{wt \% } C_{2\ iPP}) + w_{EPsoft}(\text{wt \% } C_{2\ EPsoft}) \quad \text{Equation 9}$$

6. Calculate the weight fraction PP in the insoluble fraction (XI) (wt PP in XI, $w_{iPP\ hard}$) as (wt % C2 in XI minus Wt % C2 in EP block/polymer)/(wt % C2 in PP block/polymer minus Wt % C2 in EP block/polymer) according to equation 10:

$$w_{iPPhard} = \frac{\text{wt \% } C_{3\ xylene\ insoluble} - \text{wt \% } C_{2\ EPsoft}}{\text{wt \% } C_{2\ iPPhard} - \text{wt \% } C_{2\ EPsoft}} \quad \text{Equation 10}$$

7. Calculate weight fraction of EP in XI (wt fraction EP in XI, as called $W_{EPsoft}$) as (1−weight fraction PP in Xylene insoluble) according to equation 11

$$w_{EPsoft} = 1 - w_{iPPhard} \quad \text{Equation 11}$$

8. Calculate the weight fraction of diblock in XI (wt fraction Diblock in insoluble fraction) as weight fraction EP in XI divided by weigh fraction EP in block or polymer.
9. BCI is calculated as (wt fraction Diblock in insoluble fraction) multiplying with (wt fraction of xylene insoluble).

Estimation of BCI is based on showing that the insoluble fractions contain an appreciable amount of ethylene that would not otherwise be present if the polymer were simply a blend of iPP homopolymer and EP copolymer. To account for this "extra ethylene," a mass balance calculation can be performed to estimate a block composite index from the amount of xylene insoluble and soluble fractions and the weight percent ethylene present in each of the fractions (Carnahan et al., U.S. Pat. No. 8,802,774).

The corresponding BCI calculations for BC 1 and BC 2 are provided in Table 5.

TABLE 5

| Line | Variable | Source | BC1 | BC2 |
|---|---|---|---|---|
| 1 | Overall wt % C2 Total | Measured by 13C NMR | 31.9 | 32.0 |
| 2 | wt % C2 in PP block/polymer | Measured | 0.5 | 0.5 |
| 3 | wt % C2 in EP block/polymer (or by design) | Measured | 65.0 | 65.0 |
| 4 | wt fraction iPP (in block or polymer) | Calc. | 0.513 | 0.512 |
| 5 | wt fraction EP (in block or polymer) | Calc. | 0.487 | 0.488 |
| 6 | wt fraction xylene soluble | Measured as by iCCD method as weight fraction of amorphous peak | 0.365 | 0.409 |
| 7 | wt fraction xylene insoluble | Calculated=1-wt fraction xylene soluble | 0.635 | 0.591 |
| 8 | wt % C2 in xylene soluble | Measured by $^{13}$C NMR | 62.10 | 61.30 |
| 9 | wt % C2 in xylene insoluble (={Overall wt % C2 Total-wt fraction xylene soluble *wt % C2 in xylene insoluble }/wt fraction xylene insoluble) | Calculated as Overall wt % C2 Total-wt fraction xylene soluble *wt % C2 in xylene insoluble }/wt fraction xylene insoluble) | 14.5 | 11.7 |
| 10 | wt fraction PP in insoluble | Calc. | 0.782 | 0.826 |
| 11 | wt fraction EP in insoluble fraction | Calculated as (1-wt fraction PP in soluble) | 0.218 | 0.174 |
| 12 | wt fraction Diblock in insoluble fraction | Line 11/Line 5 | 0.447 | 0.356 |
| 13 | Block Composite Index (BCI) | Line 12*line 7 | 0.284 | 0.211 |

Other materials used in the examples are provided in Table 6 below.

TABLE 6

| Materials | | |
|---|---|---|
| Component | Specification | Source |
| INFUSE D9130.05 | ethylene/1-octene multi-block copolymer density = 0.886 g/cc; melt index (I2) = 1.5 g/10 min; melting point = 123.5° C.; single melting peak; $H_f$ = 52.2 J/g | The Dow Chemical Co. |

C. Pelletizing

The components were fed into the hopper of a Werner & Pfleiderer ZSK 40 Mc Plus co-rotating intermeshing twin screw extruder. The temperature profile was as follows: 180/180/180/180/185/185/185/180/180° C.

For samples containing a blend of BC 1 and CBC 3 (each produced as described above), the BC 1 and CBC 3 were premixed by dry blending before being fed into the hopper of the extruder. An underwater pelletizer from Gala Industries was used to prepare small round-shaped pellets containing the extrudate. The pellets had a diameter around 1~3 mm, and roughly 100~150 counts/gram. The composition and properties of the pellets are provided below in Table 7.

TABLE 7

Pellet Composition and Properties*

| | INFUSED 9130.05 (wt %) | BC 1 (wt %) | BC 2 (wt %) | CBC 3 (wt %) | Melting Peak(s) | $Tm1^P$ (° C.) | $Tm2^P$ (° C.) | Total Delta $H_f$ of melting peaks (J/g)[#] |
|---|---|---|---|---|---|---|---|---|
| CS 1 Pellet | 100 | — | — | — | single | 123.5 | — | 46.0 |
| Ex 2 Pellet | — | — | — | 100 | two | 106.6 | 136.7 | 82.4 |
| Ex 3 Pellet | — | 50 | — | 50 | two | 103.7 | 139.9 | 56.5 |
| Ex 4 Pellet | — | 80 | — | 20 | two | 102.6 | 141.7 | 44.8 |
| Ex 5 Pellet | — | 100 | — | — | two | 46.3 | 140.3 | 34.8 |
| Ex 6 Pellet | — | — | 100 | — | two | 46.4 | 128.4 | 34.2 |

*wt % in Table 7 is based on the total weight of the pellet

CS = comparative sample $Tm1^P$ = first melting peak of the pellet $Tm2^P$ = second melting peak of the pellet

[#]The heat of fusion is that of the sum of the two melting peaks (endotherms), and which is determined by the total area of such peaks under one baseline fit, from baseline before the onset of melting of the lower melting peak, to the return baseline after the higher melting peak.

FIG. 1 is a DSC heating curve for the sample pellets. As shown, CS 1 Pellet has a single melting peak, while Ex 2-Ex 6 each exhibits at least two melting peaks.

D. Production of Foam Beads

Pellets were fed into an auto-clave equipped with a heating unit and gas injection valve. The auto-clave was heated to the foaming temperature provided in Table 8 below. At the same time, a blowing agent (high pressure $CO_2$) was injected into the auto-clave until saturation (0.5~2 hours). The auto-clave pressure varies depending on the resin type, but is typically 50-200 bar. After the polymer was fully saturated with blowing agent, a fast depressurization occurred and the foamed beads were formed. The foamed beads were conditioned at room temperature (23° C.) for several days to allow gas exchange between inside and outside of the foam beads.

The composition and properties of the foam beads are provided below in Table 8.

E. Sintering

Sintered foam structures were formed from the foam beads. Foamed beads were vacuum sucked into a steam chesting mold. Then, high pressure steam was injected into the mold to heat/melt the foam beads' surface. At the same time, the mold was closed to achieve inter-bead sintering. The steam pressure was dependent on the resin type contained in the foam beads. Sintering was followed by a water cooling process and a vacuum process to remove water from the sintered foam structure. The whole cycle time was 2-5 min. The prepared sintered foam structure was a plaque with the following dimensions: 20 cm (length)×10 cm (width)× 1-2 cm (thickness).

The composition and properties of the sintered foam structures are provided below in Table 4.

TABLE 8

Composition and Properties of Foam Beads*

| | Composition | Foaming Temp. (° C.) | Foam Density (g/cc) | Melting Peak(s) | $Tm1^{FB}$ (° C.) | $Tm2^{FB}$ (° C.) | Total Delta $H_f$ of melting peaks (J/g)[#] |
|---|---|---|---|---|---|---|---|
| CS 1 Foam Bead | CS 1 Pellet (100 wt % INFUSED 9130.05) | 112 | 0.12-0.14 | single | 120.2 | — | 46.8 |
| Ex 2 Foam Bead | Ex 2 Pellet (100 wt % CBC 3) | 103 | 0.07-0.08 | two | 105.1 | 125.5 | 76.4 |
| Ex 3 Foam Bead | Ex 3 Pellet (50 wt % BC 1/ 50 wt % CBC 3) | 105 | 0.11 | two | 105.0 | 139.1 | 52.0 |
| Ex 4 Foam Bead | Ex 4 Pellet (80 wt % BC 1/ 20 wt % CBC 3) | 105 | 0.11 | two | 103.5 | 140.1 | 37.9 |
| Ex 5 Foam Bead | Ex 5 Pellet (100 wt % BC 1) | 117 | 0.09-0.10 | two | 45.1 | 136.7 | 36.3 |
| Ex 6 Foam Bead | Ex 6 Pellet (100 wt % BC 2) | 117 | 0.05-0.07 | two | 45.7 | 134.6 | 34.6 |

*wt % in Table 8 is based on the total weight of the foam bead

CS = comparative sample

[#]The heat of fusion is that of the sum of the two melting peaks (endotherms), and which is determined by the total area of such peaks under one baseline fit, from baseline before the onset of melting of the lower melting peak, to the return baseline after the higher melting peak.

TABLE 9

Composition and Properties of Sintered Foam Structures*

|  | CS 1 Structure | Ex 2 Structure | Ex 3 Structure | Ex 4 Structure | Ex 5 Structure | Ex 6 Structure |
|---|---|---|---|---|---|---|
| Composition | CS 1 Foam Bead (100 wt % INFUSED 9130.05) | Ex 2 Foam Bead (100 wt % CBC 3) | Ex 3 Foam Bead (50 wt % BC 1/ 50 wt % CBC 3) | Ex 4 Foam Bead (80 wt % BC 1/ 20 wt % CBC 3) | Ex 5 Foam Bead (100 wt % BC 1) | Ex 6 Foam Bead (100 wt % BC 2) |
| Foam Density | 0.239 g/cc | 0.147 g/cc | 0.166 g/cc | 0.174 g/cc | 0.184 g/cc | 0.085 g/cc |
| Asker C | 30.6 | 63.0 | 60.0 | 63.4 | 56.4 | 42.6 |
| Falling Ball Rebound | 58.4% | 39.6% | 42.4% | 43.2% | 44.0% | 49.0% |
| Average Strain at Break | 39% | 28% | 24% | 30% | 32% | 43% |
| Average Stress at Break | 0.47 MPa | 1.4 MPa | 1.63 MPa | 1.29 MPa | 1.31 MPa | 0.75 MPa |
| Type C Tear | 2.97 N/mm | 10.2 N/mm | 13.4 N/mm | 10.4 N/mm | 9.8 N/mm | 8.6 N/mm |
| Split Tear | 1.38 | 2.22 | 2.21 | 2.05 | 1.75 | 1.99 |
| Linear Shrinkage | 0.4% | 0.4% | 0.5% | 0.3% | 0.6% | 0.5% |
| Compression Set 50 % (50° C./6 hours) | 80.4% | 77.2% | 81.0% | 85.5% | 87.3% | 87.8% |

*wt % in Table 9 is based on the total weight of the sintered foam structure
CS = comparative sample FIG. 2 is a SEM micrograph of Ex 5 Structure showing the interface of the foam beads.

Figure 3:
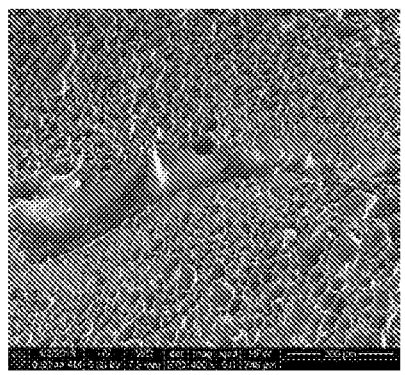
FIG. 3 is a scanning electron microscope (SEM) micrograph of CS 1 Structure.

FIG. 3 is a SEM micrograph of CS 1 Structure showing the interface of the foam beads.

It has been discovered that sintered foam structures formed from foam beads containing one or both of (A) a block composite (BC1 or BC 2) and (B) a crystalline block composite (CBC 3) exhibit (i) lower foam density (less than 0.20 g/cc); (ii) higher Asker C hardness (greater than 42); and (iii) higher average stress at break (greater than 0.50 MPa), and (iv) higher type C tear strength (greater than 5 N/mm) and (v) higher split tear strength (greater than 1.5 N/mm) than a comparative sintered foam structure containing ethylene/1-octene multi-block copolymer (INFUSE D9130.05) (Compare Ex 2 Structure-Ex 6 Structure with CS 1 Structure).

The lower foam density (less than 0.20 g/cc) indicates that foam beads containing one or both of (A) a block composite (BC1 or BC 2) and (B) a crystalline block composite (CBC 3) has both good foamability and sufficient steam chest molding performance, indicating less shrinkage in the molding process. Lower foam density in sintered foam could provide lightweight foam, which is advantageous for sport shoes for the sake of high energy efficiency.

It has been unexpectedly discovered that that sintered foam structures formed from foam beads containing one or both of (A) a block composite (BC1 or BC 2) and (B) a crystalline block composite (CBC 3) exhibit both low foam density (less than 0.20 g/cc) and acceptable linear shrinkage (less than, or equal to, 1.0%) for sintered foam structure applications at low foam density (even down to less than 0.1 g/cc), such as midsole applications (See Ex 2 Structure-Ex 6 Structure). The combination of both low foam density (less than 0.20 g/cc) and low linear shrinkage (less than, or equal to, 1.0%) is unexpected because foam structures with lower densities conventionally exhibit increased linear shrinkage upon heating due to the relaxation of the molecular chain in the cell wall. The combination of both low foam density (less than 0.20 g/cc) and low linear shrinkage (less than, or equal to, 1.0%) is advantageous for sintered foam structure applications, such as midsole applications, because it requires less materials with improved energy efficiency for sport running shoes.

It is specifically intended that the present disclosure not be limited to the embodiments and illustrations contained herein, but include modified forms of those embodiments including portions of the embodiments and combinations of elements of different embodiments as come within the scope of the following claims.

We claim:
1. A foam bead comprising at least one of the following components:
(A) a block composite containing three polymer components
(ai) an ethylene-based polymer having an ethylene content from 10 mol % to less than 90 mol %, based on the total moles of polymerized monomer units in the ethylene-based polymer;
(aii) an alpha-olefin based polymer having an alpha-olefin content of greater than 90 mol %, based on the total moles of polymerized monomer units in the alpha-olefin based polymer; and
(aiii) a block copolymer having an ethylene block and an alpha-olefin block, wherein the ethylene block contains more polymerized ethylene than the alpha-olefin block and the ethylene block of the block copolymer is the same composition as the ethylene-based polymer (ai) and the alpha-olefin block of the block copolymer is the same composition as the alpha-olefin based polymer (aii); and/or
(B) a crystalline block composite containing three polymer components
(bi) a crystalline ethylene-based polymer having an ethylene content of greater than , or equal to, 90 mol %, based on the total moles of polymerized monomer units in the crystalline ethylene-based polymer;
(bii) a crystalline alpha-olefin based polymer having an alpha-olefin content of greater than 90 mol %, based on the total moles of polymerized monomer units in the crystalline alpha-olefin based polymer; and
(biii) a block copolymer comprising a crystalline ethylene block and a crystalline alpha-olefin block, wherein the crystalline ethylene block of the block copolymer is the same composition as the crystalline ethylene-based polymer (bi) and the crystalline alpha-olefin block of the block copolymer is the same as the crystalline alpha-olefin based polymer (bii).

2. The foam bead of claim 1 comprising (A) the block composite.

3. The foam bead of claim 1 comprising (B) the crystalline block composite.

4. The foam bead of claim 1, wherein the foam bead has a weight ratio of (A) the block composite and (B) the crystalline block composite of from 0.25:1.0 to 4.0:1.0.

5. The foam bead of claim 1, wherein the foam bead has two melting peaks.

6. The foam bead of claim 1, wherein the foam bead has a first melting peak ($Tm1^{FB}$) and a second melting peak ($Tm2^{FB}$), and the difference between $Tm1^{FB}$ and $Tm2^{FB}$ is greater than, or equal to, 20° C.

7. A sintered foam structure formed from a composition comprising at least one of the following components:
(A) a block composite containing three polymer components
  (ai) an ethylene-based polymer having an ethylene content from 10 mol % to less than 90 mol %, based on the total moles of polymerized monomer units in the ethylene-based polymer;
  (aii) an alpha-olefin based polymer having an alpha-olefin content of greater than 90 mol %, based on the total moles of polymerized monomer units in the alpha-olefin based polymer; and
  (aiii) a block copolymer having an ethylene block and an alpha-olefin block, wherein the ethylene block contains more polymerized ethylene than the alpha-olefin block and the ethylene block of the block copolymer is the same composition as the ethylene-based polymer (ai) and the alpha-olefin block of the block copolymer is the same composition as the alpha-olefin based polymer (aii); and/or
(B) a crystalline block composite containing three polymer components
  (bi) a crystalline ethylene-based polymer having an ethylene content of greater than, or equal to, 90 mol %, based on the total moles of polymerized monomer units in the crystalline ethylene-based polymer;
  (bii) a crystalline alpha-olefin based polymer having an alpha-olefin content of greater than 90 mol %, based on the total moles of polymerized monomer units in the crystalline alpha-olefin based polymer; and
  (biii) a block copolymer comprising a crystalline ethylene block and a crystalline alpha-olefin block, wherein the crystalline ethylene block of the block copolymer is the same composition as the crystalline ethylene-based polymer (bi) and the crystalline alpha-olefin block of the block copolymer is the same as the crystalline alpha-olefin based polymer (bii).

8. The sintered foam structure of claim 7, wherein the sintered foam structure has a foam density of less than 0.20 g/cc; and a linear shrinkage of less than, or equal to, 1.0%.

9. The sintered foam structure of claim 7 comprising (A) the block composite.

10. The sintered foam structure of claim 7, wherein the sintered foam structure has a Type C Tear from 4.5 N/mm to 15 N/mm; and an average stress at break greater than, or equal to, 0.50 MPa.

* * * * *